Feb. 24, 1953 T. M. HARRER 2,629,417
FRUIT SPLITTER AND PITTER
Filed Oct. 13, 1947 17 Sheets-Sheet 1

INVENTOR.
THEODORE M. HARRER
BY
Boykin, Mohler & Beckley
ATTORNEYS

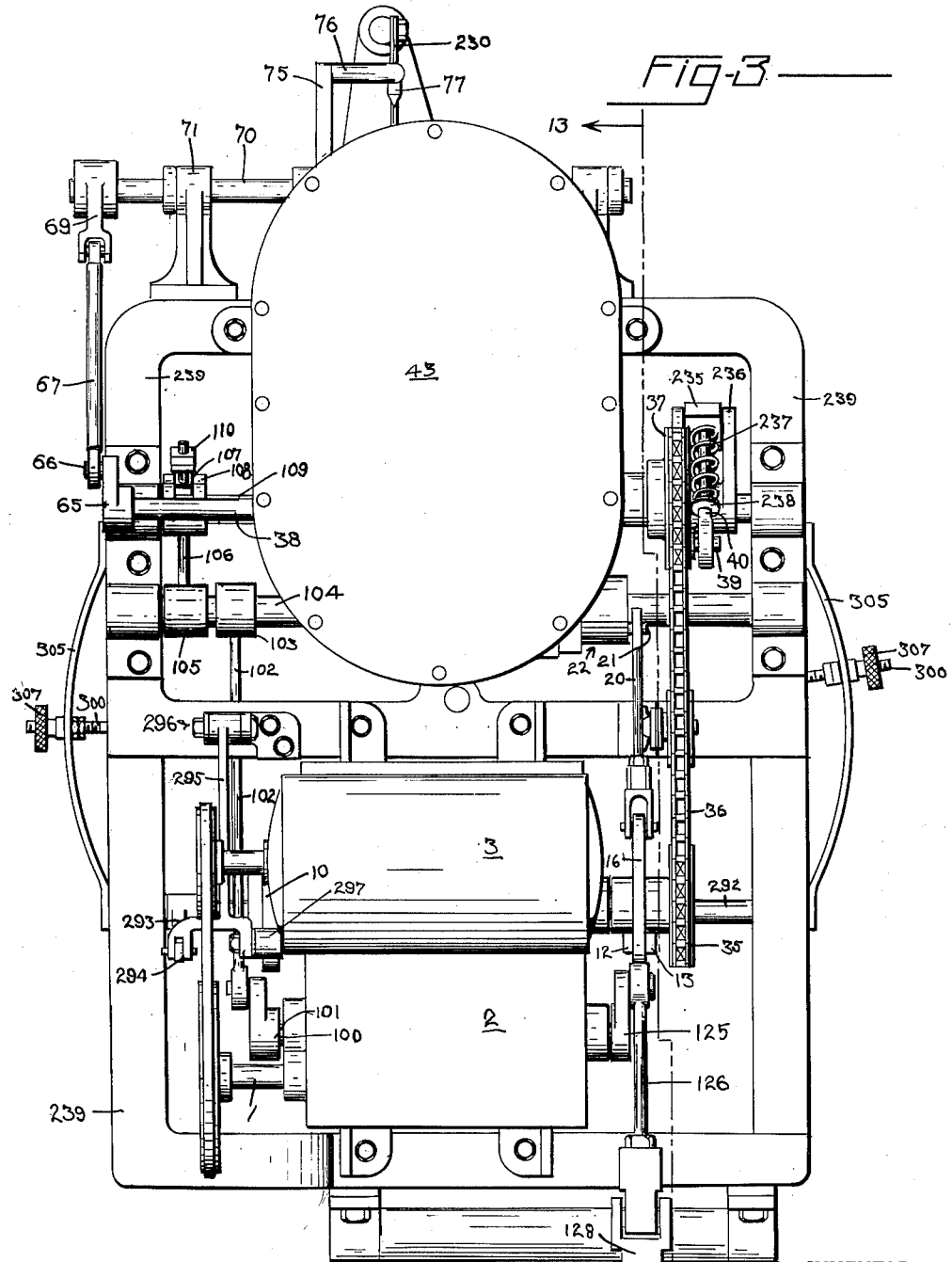

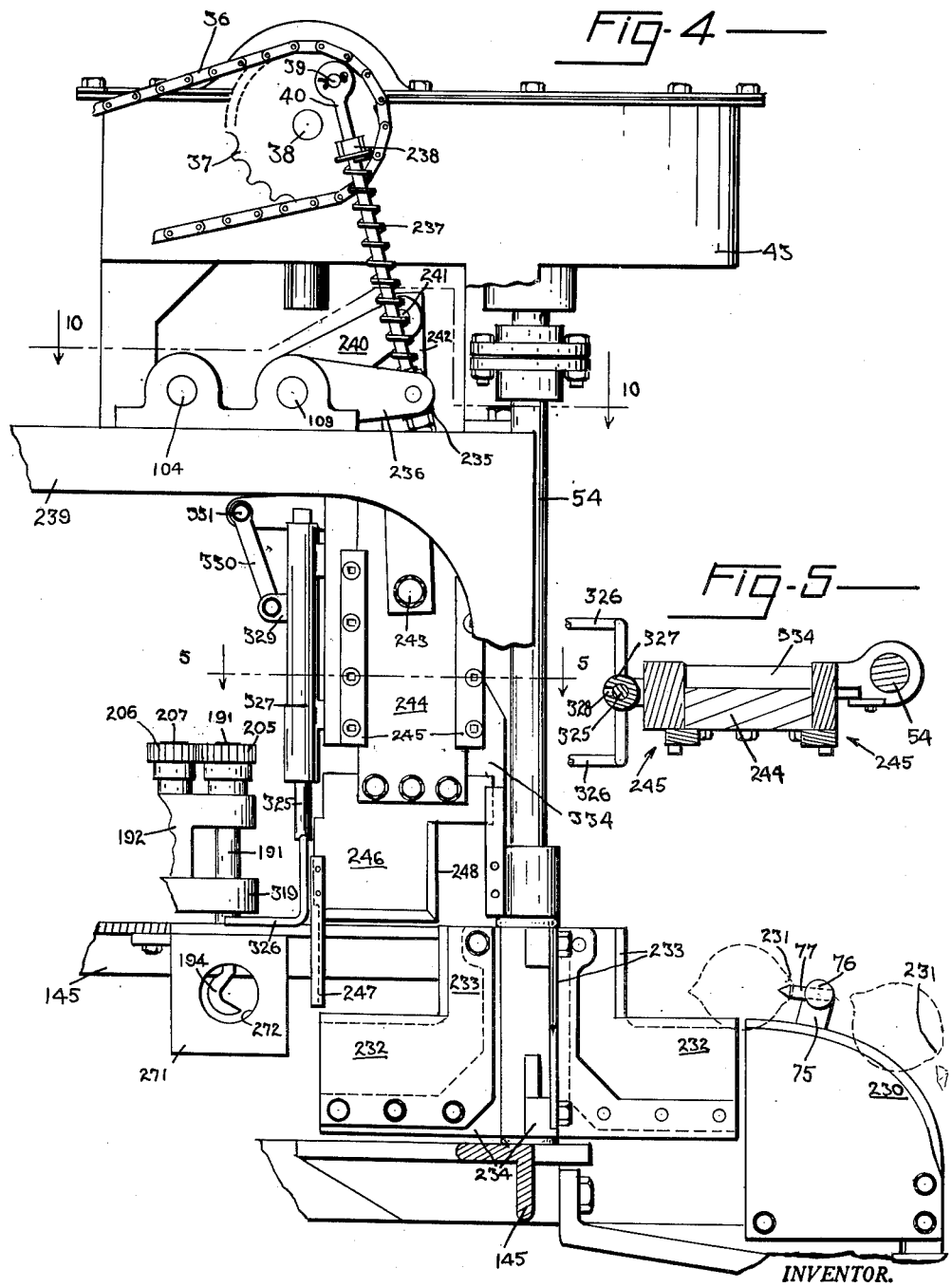

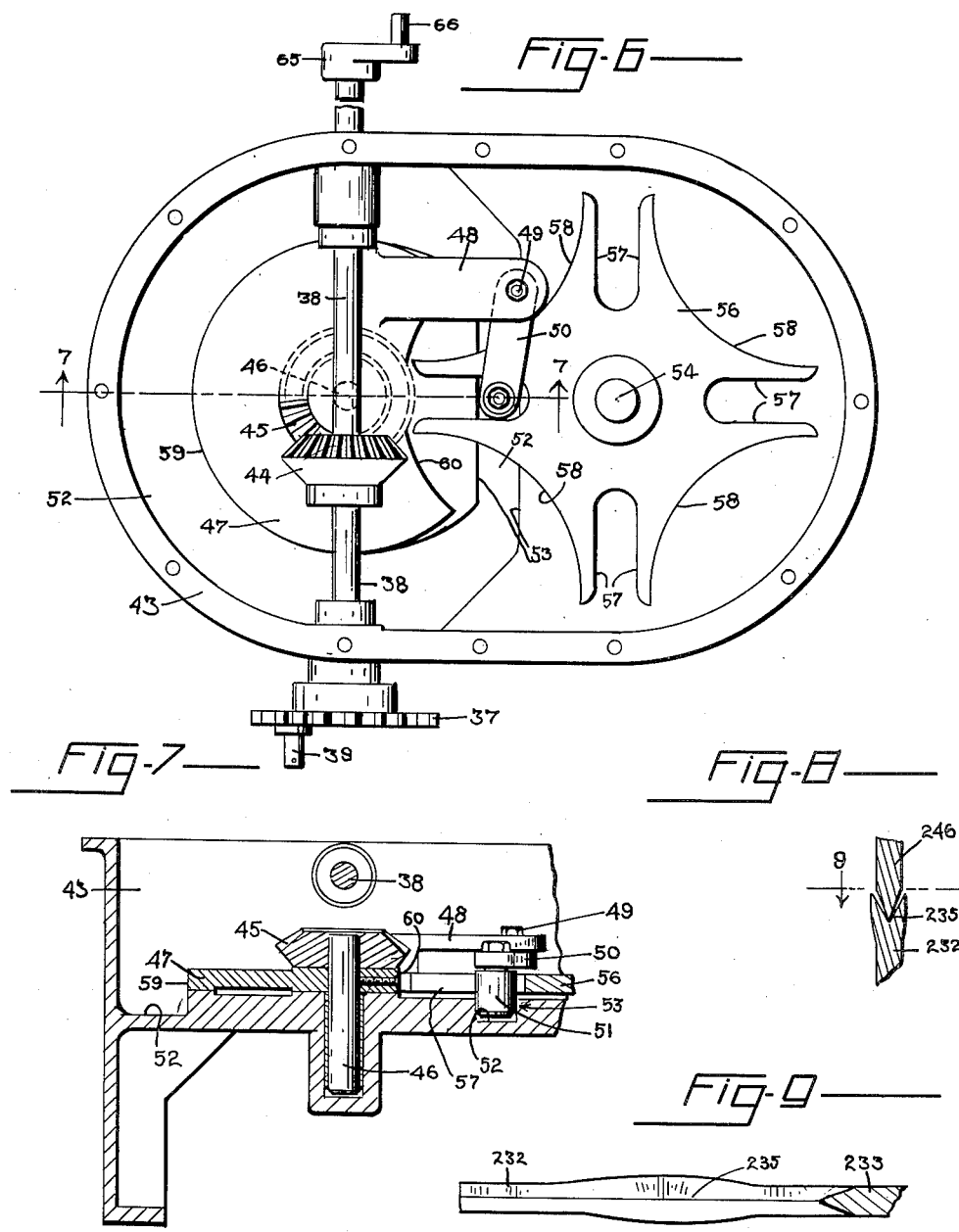

Feb. 24, 1953 — T. M. HARRER — 2,629,417
FRUIT SPLITTER AND PITTER
Filed Oct. 13, 1947 — 17 Sheets-Sheet 5
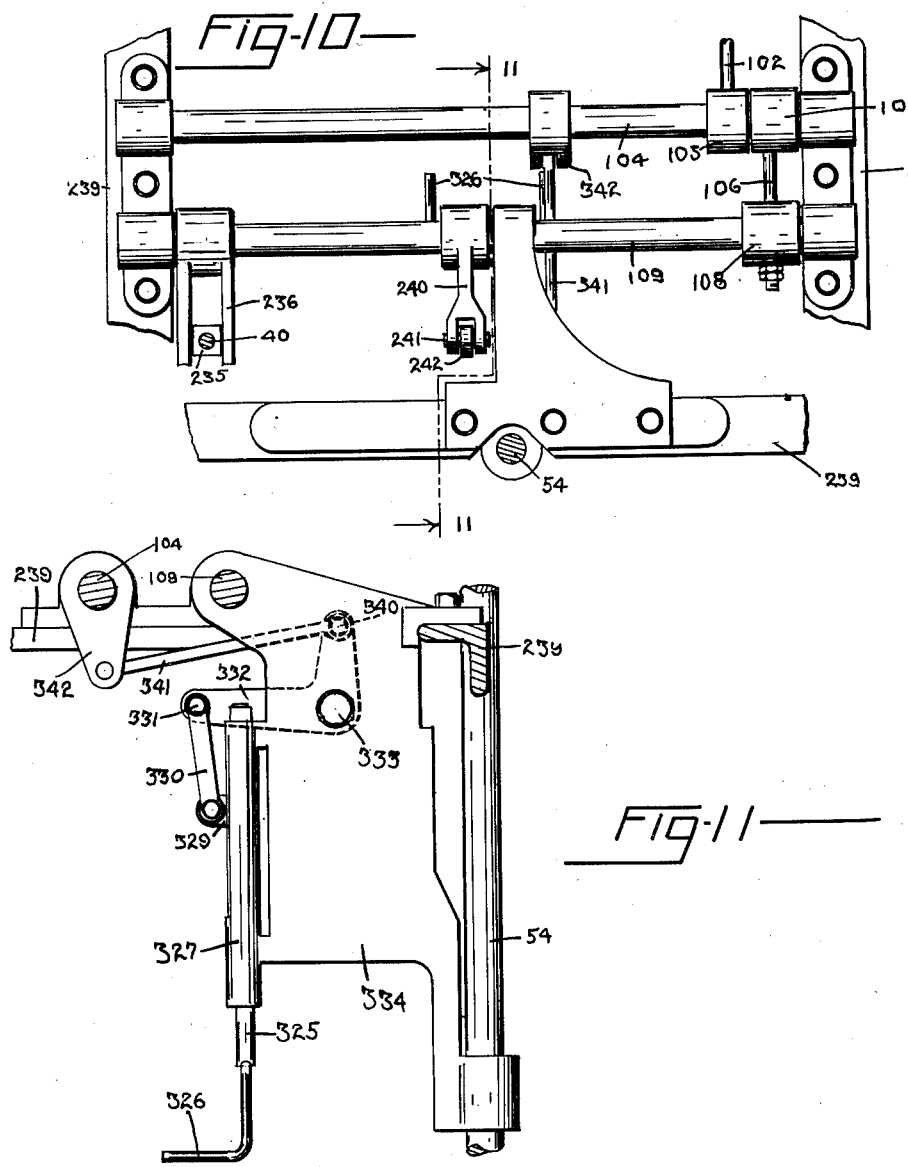
INVENTOR.
THEODORE M. HARRER
BY
Boyken, Mohler & Boyken
ATTORNEYS

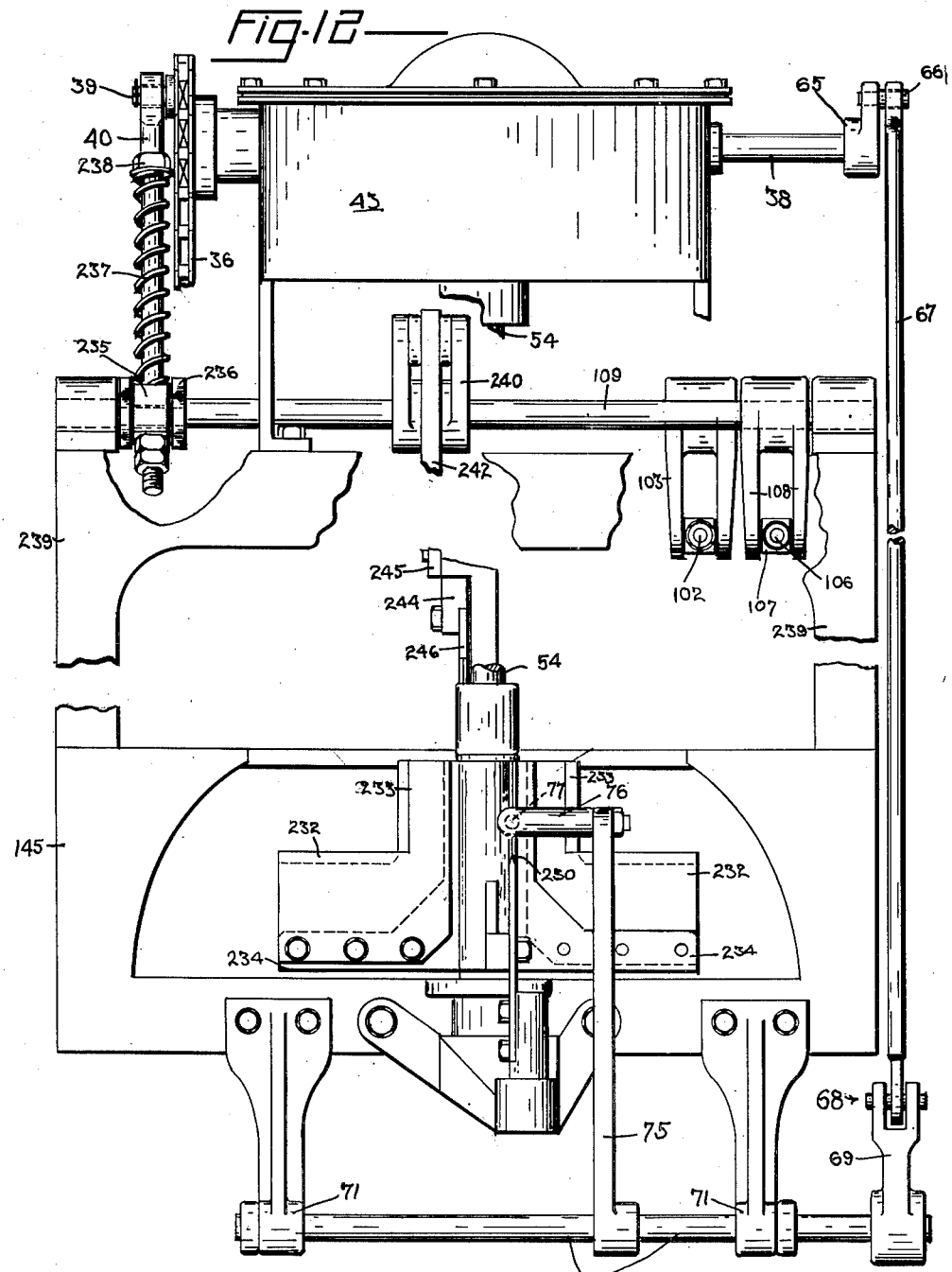

Feb. 24, 1953 T. M. HARRER 2,629,417
FRUIT SPLITTER AND PITTER
Filed Oct. 13, 1947 17 Sheets-Sheet 7

INVENTOR.
THEODORE M. HARRER
BY
Boyken, Mohler & Beckley
ATTORNEYS

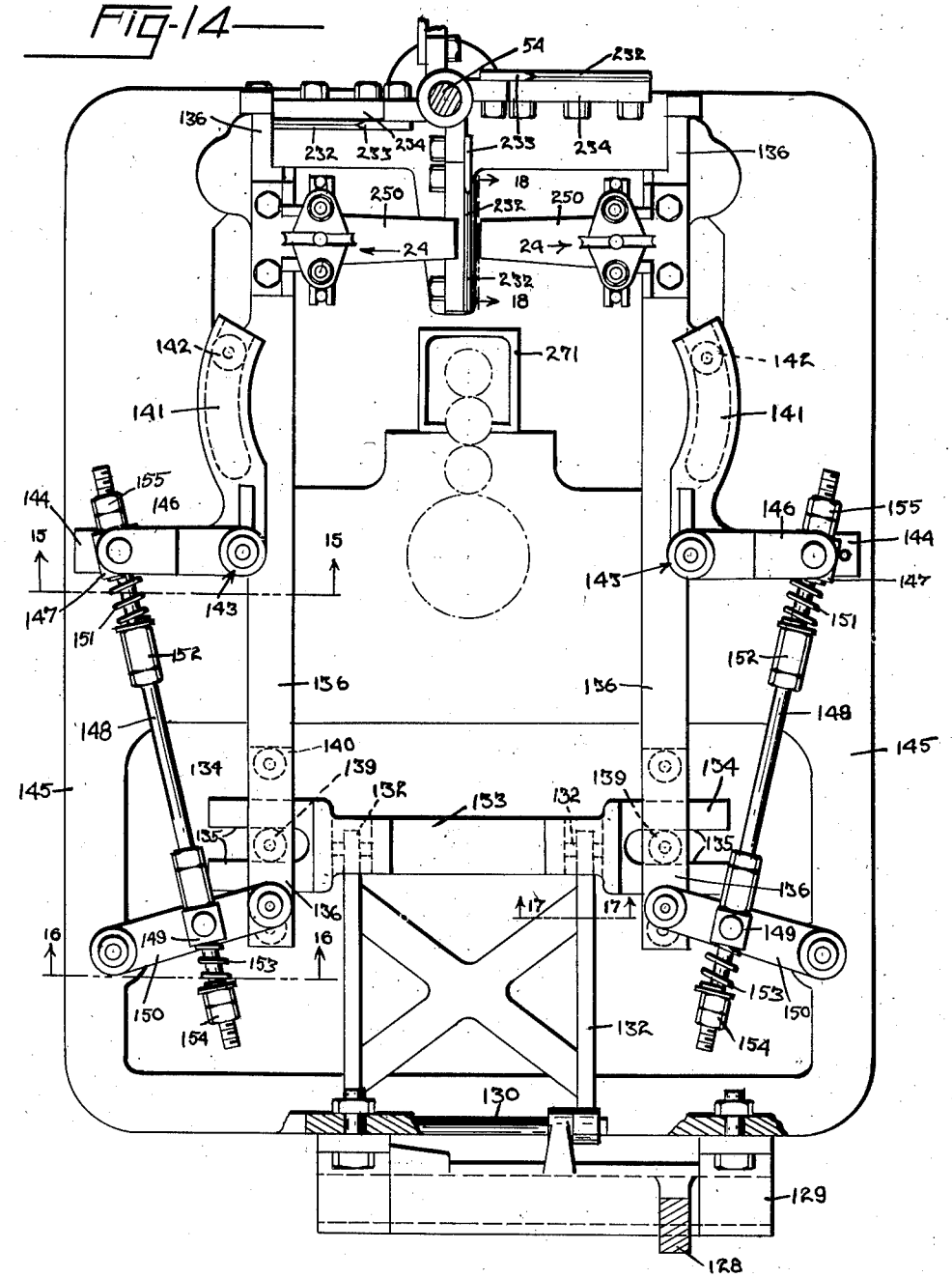

Feb. 24, 1953   T. M. HARRER   2,629,417
FRUIT SPLITTER AND PITTER
Filed Oct. 13, 1947   17 Sheets-Sheet 9
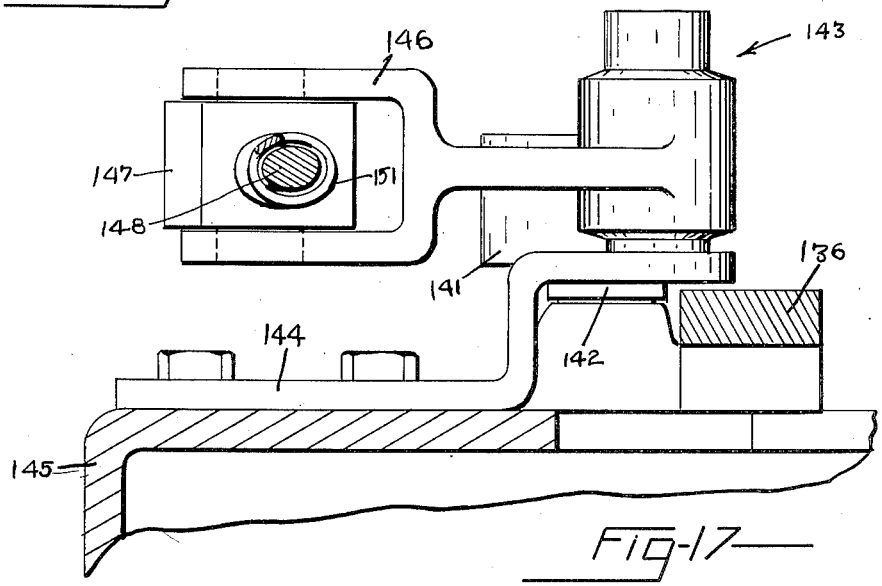
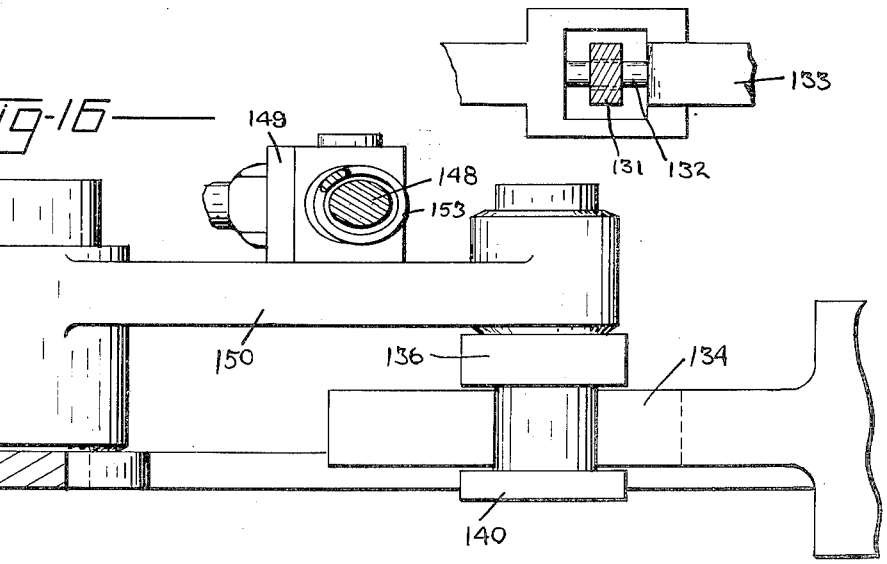
INVENTOR.
THEODORE M. HARRER
BY
Boykin, Mohler & Beckley
ATTORNEYS

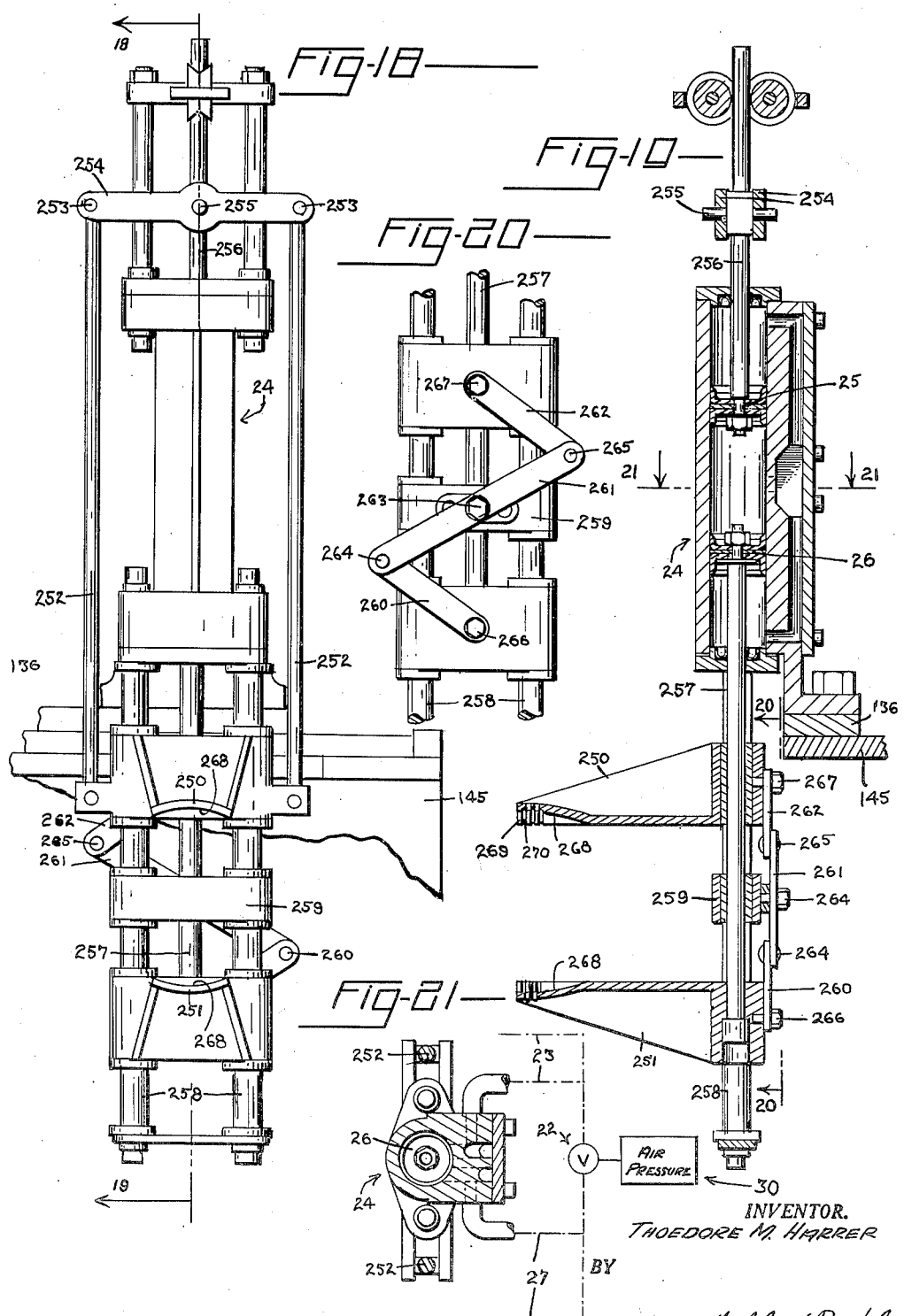

Feb. 24, 1953

T. M. HARRER 2,629,417

FRUIT SPLITTER AND PITTER

Filed Oct. 13, 1947

INVENTOR.
THEODORE M. HARRER

BY
Bozken Mohler & Beckley
ATTORNEYS

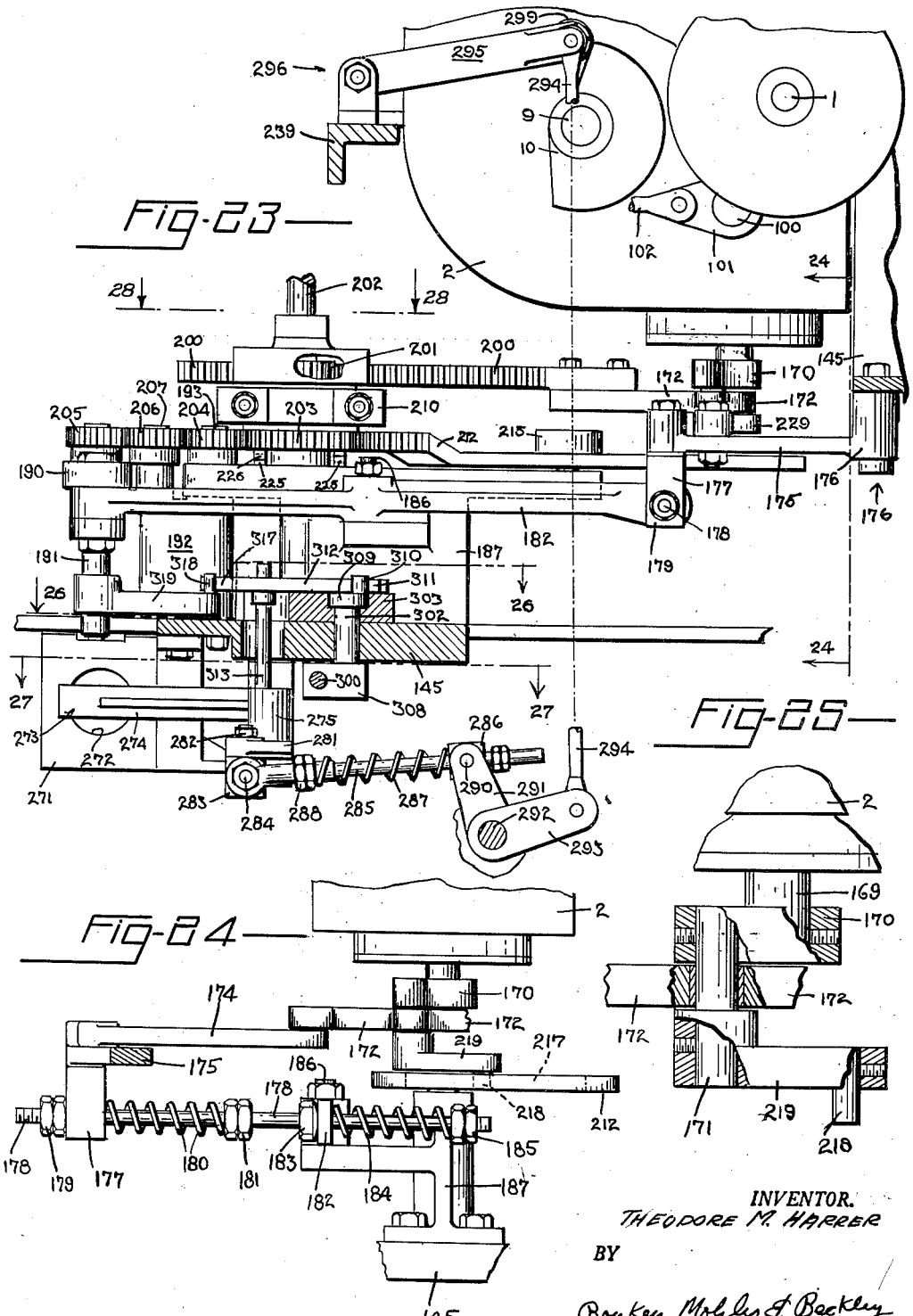

Feb. 24, 1953 — T. M. HARRER — 2,629,417
FRUIT SPLITTER AND PITTER
Filed Oct. 13, 1947 — 17 Sheets-Sheet 13

INVENTOR.
THEODORE M. HARRER
BY
Boykin Mohler & Beckley
ATTORNEYS

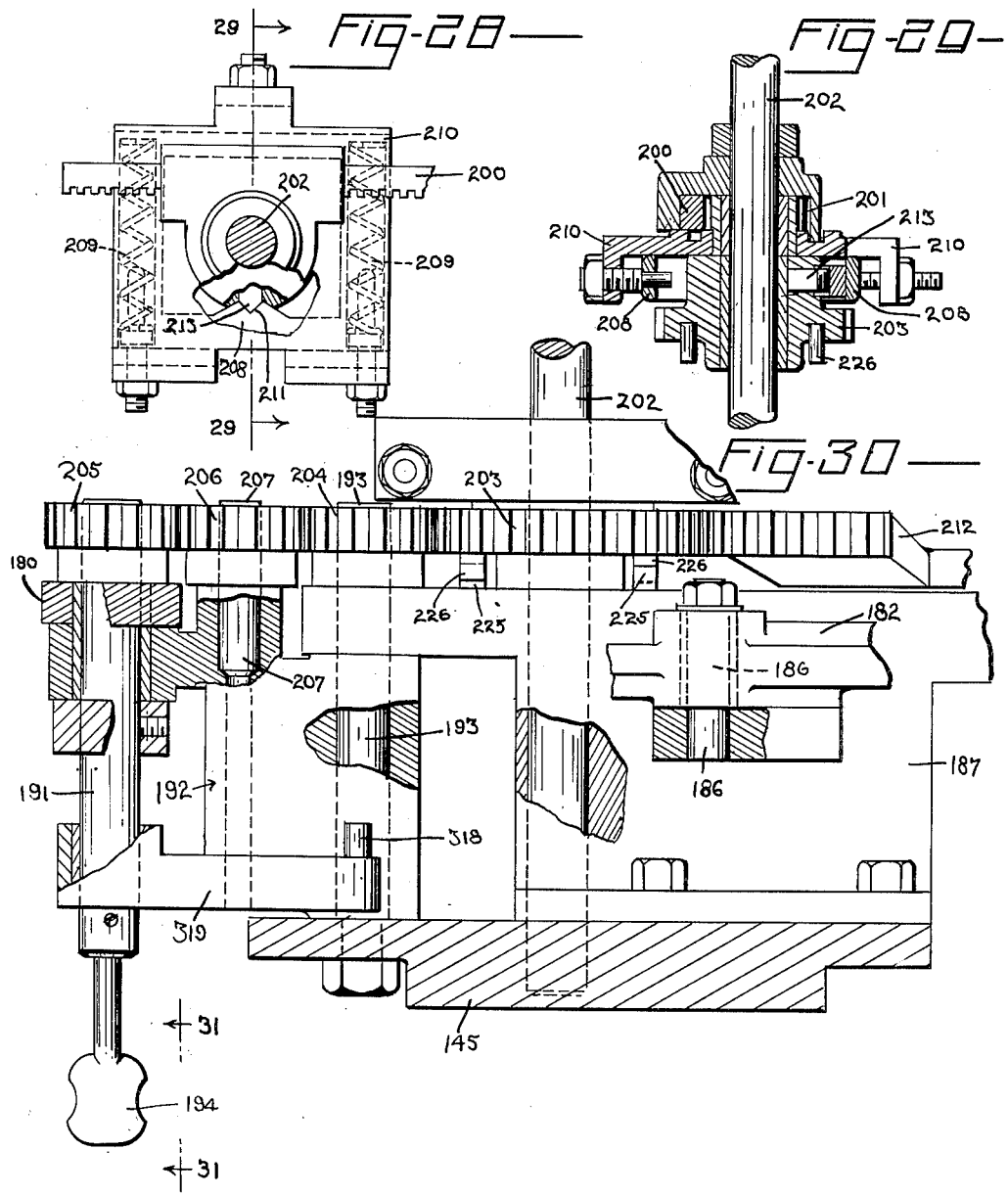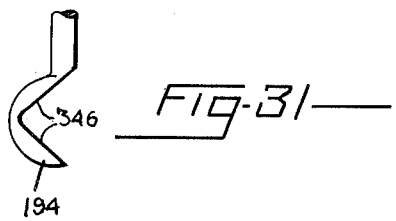

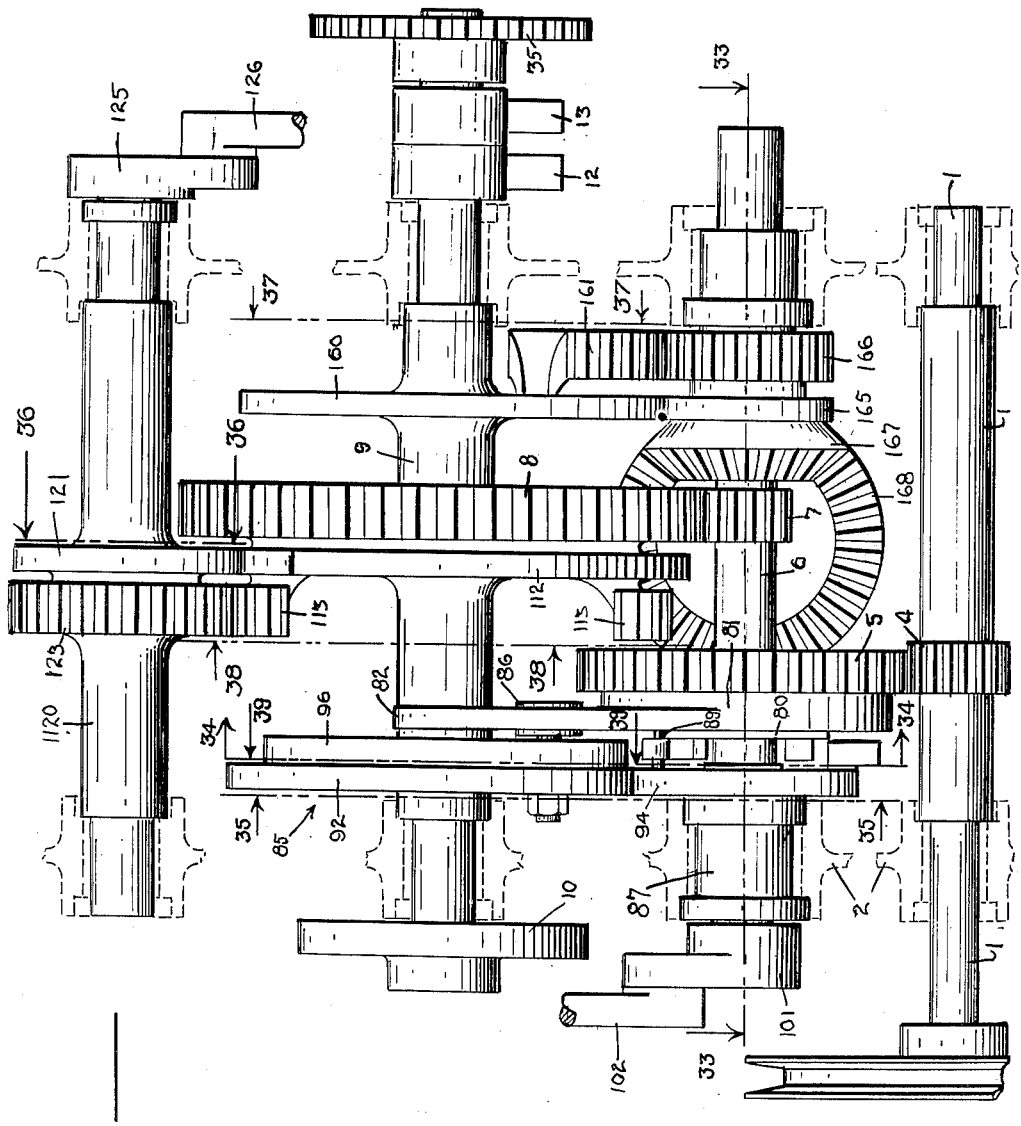

Feb. 24, 1953        T. M. HARRER        2,629,417
FRUIT SPLITTER AND PITTER
Filed Oct. 13, 1947        17 Sheets-Sheet 16
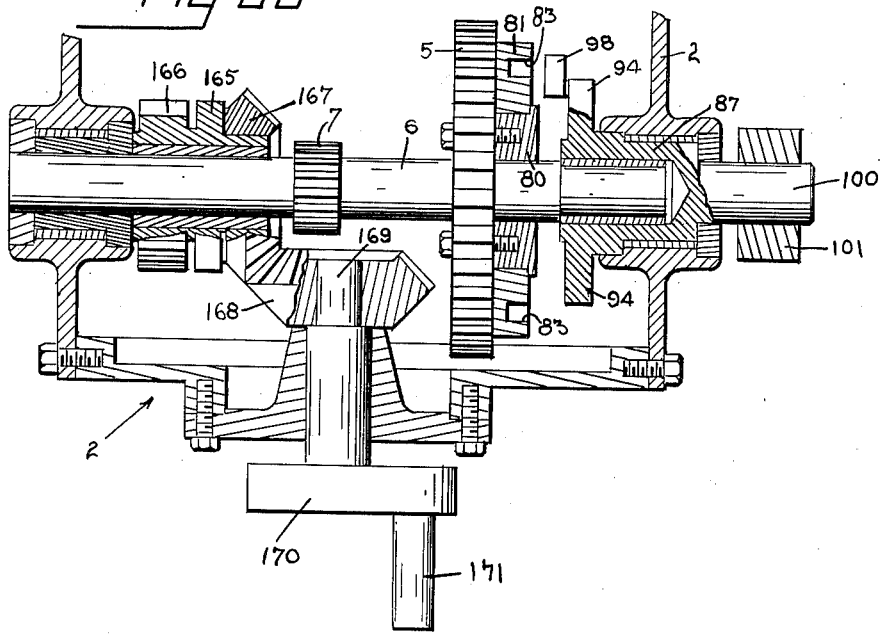
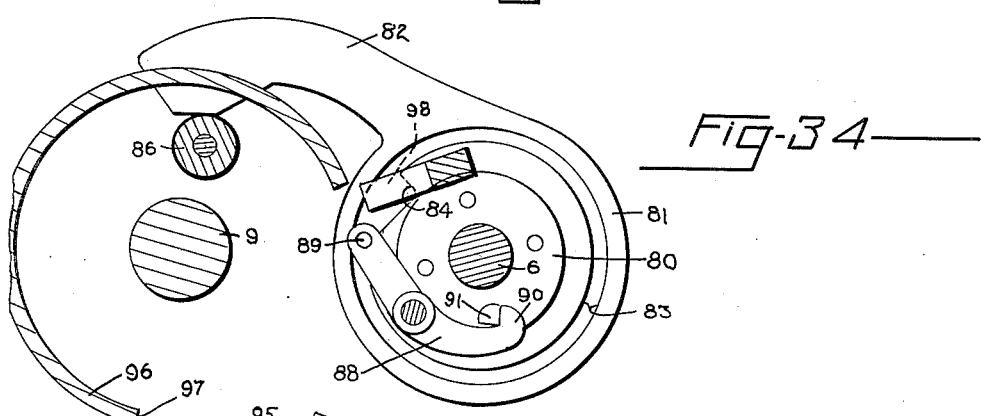
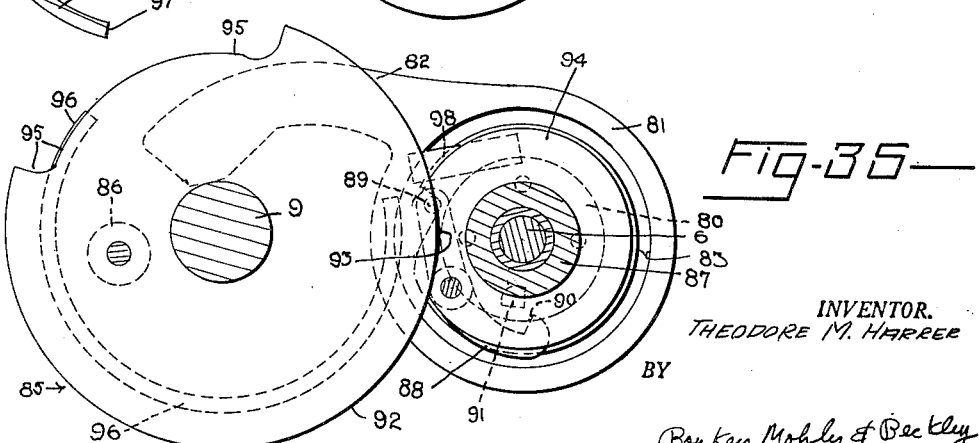
INVENTOR.
THEODORE M. HARRER
BY
Boykan Mohler & Beckley
ATTORNEYS

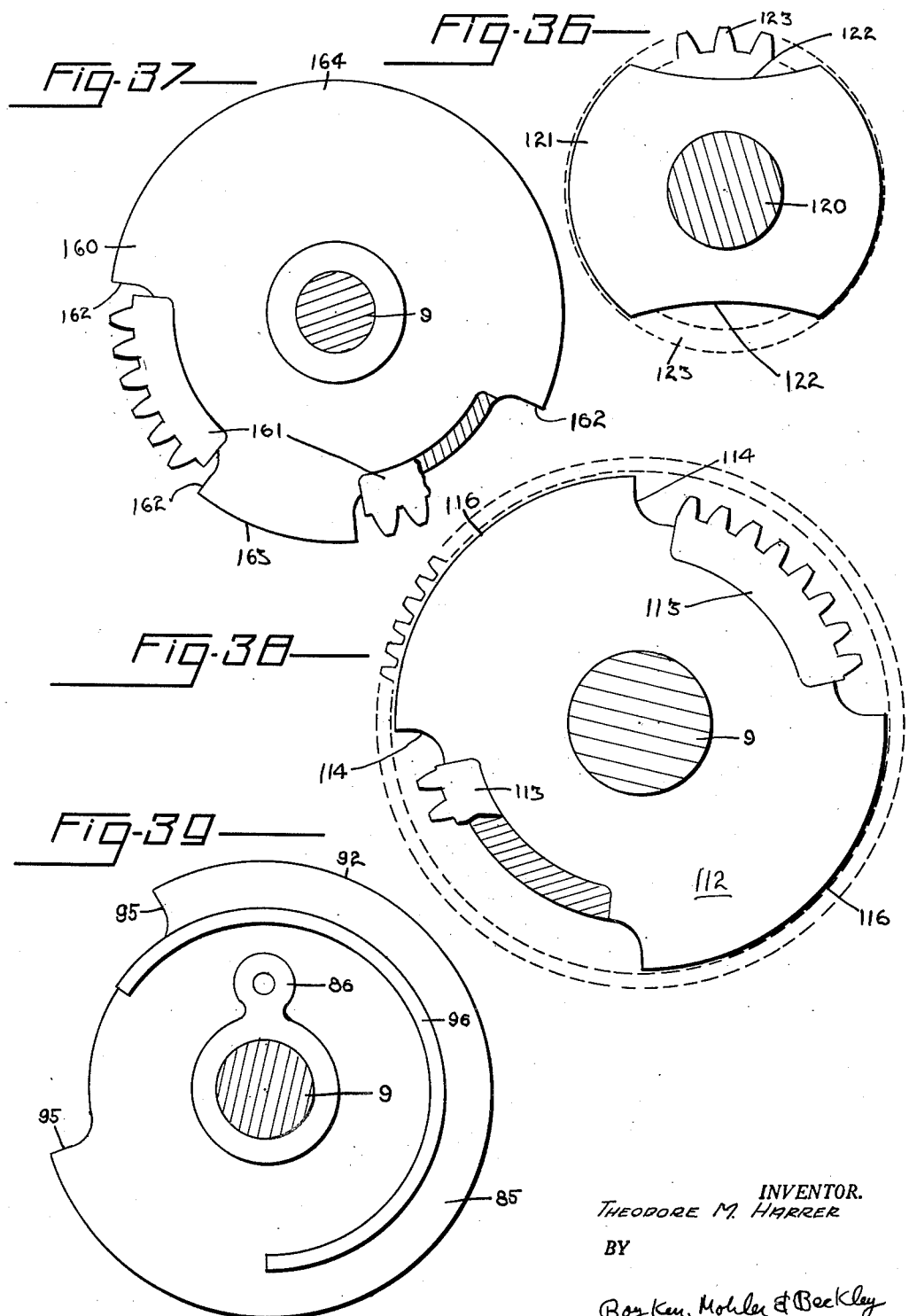

Patented Feb. 24, 1953

2,629,417

UNITED STATES PATENT OFFICE 2,629,417

FRUIT SPLITTER AND PITTER

Theodore M. Harrer, Oakland, Calif., assignor to Fruit Machinery Company, a corporation of Nevada Application October 13, 1947, Serial No. 779,594

8 Claims. (Cl. 146—28)

This invention relates to a fruit pitter of the type disclosed in United States Letters Patent 2,336,123 to J. Perrelli et al., dated December 7, 1943, and has for one of its objects the provision of improved means for feeding peaches and the like to a splitter, including an improved splitter for splitting the fruit.

Another object of the invention is the provision of improved means in a fruit pitter for transferring the fruit halves from the splitter to the pitter and for removing the halves from the pitter.

A still further object of the invention is the provision of improved means in a fruit pitter for controlling the pitting operation and for pitting the fruit halves with the minimum of waste.

An added object is the provision of an improved fruit splitting and pitting machine that is efficient, safe and that is adapted to operate substantially free from mechanical difficulties and breakages and which machine automatically splits and pits the fruit fed thereto.

The present machine is for automatically splitting and pitting drupes, such as clingstone peaches in which the fruit, including the pit, is split in the plane of the suture of the fruit.

Heretofore, as in the machine disclosed in the above invention, it has generally been the practice for the operator to place the fruit on a blade on which the fruit is initially supported in a position with the plane of its suture in the plane of the blade. From this blade the fruit has been pushed or moved to a position between the splitting blades, the latter usually constituting a stationary lower blade and a guillotine type blade coplanar therewith and movable toward and away from the stationary blade.

This former practice creates a nervous tension on the part of the operator inasmuch as the proximity of the splitter blades to the positioning blade on which the operator manually positions the fruit produces the feeling of imminent danger to the fingers of the operator. If a mere increase in distance is established to overcome this, then the capacity of the machine is reduced.

By the present invention a turret revolvable about a vertical axis carries a plurality of equally spaced vertical blades that are called "anvils" or "anvil blades" because they have an upper edge on which the pit of a peach, or the like, is supported during the splitting of the peach so as not to dislodge the pit relative to the flesh or meat during said operation. Each fruit body is positioned manually on a positioning blade alongside said turret and at a point where the said body may be slid from the positioning blade onto one of said anvils. The turret intermittently rotates about its axis carrying each fruit body to the side opposite the positioning blade and there a descending guillotine blade splits the body including the pit. By this arrangement it is obvious that the fingers of the operator could not in any way be injured by the splitting blade and as a result the speed of the machine may be materially increased without loss of efficiency on the part of the operator.

Just before the peach is split by the splitter, a pair of pneumatically operated clamps at each opposite side of the splitter engages each fruit half and holds it. Heretofore, as in the above mentioned patent, these clamps have at times tended to dislodge the fruit slightly by reason of one of the clamps sticking or engaging the fruit before the other, but by the present invention the clamps are automatically self-adjusting to clamp the fruit irrespective of size or surface irregularities without dislodging the fruit halves relative to each other or relative to the pit before, during and after the splitting operation. Thus, by insuring against such dislodgement, the fruit halves after being split can be transferred to the pitter with great precision which is necessary for a perfect pitting operation.

After being split, the halves are held by the pneumatically operated clamps which are supported for a reciprocatory movement, as distinguished from an oscillatory movement, from the splitter to the pitter. During this reciprocatory movement the halves are moved away from each other so as to be sufficiently spaced at the pitting station to enable the pitter blade to work between them. This reciprocatory movement is preferable to an oscillatory movement, being faster and more positive and accurate in handling the peach halves.

A pair of vertical opposed spaced plates at the pitting station have central aligned openings therein and the peach halves are moved by the pneumatically actuated clamps to positions over said openings so that the pits will be exposed through the openings for removal by the pitting blade that is between the said plates, and as soon as the halves are so positioned a pair of mechanically actuated clamps yieldably clamp said halves against said plates permitting the pneumatic clamps to release their hold and return for holding another peach at the splitter. These mechanically actuated clamps have pivoted clamping members that are curved to substantially conform to the contour of the peach and by reason of the pivots mounting said members the latter will readily adjust themselves to any irregularities in the contour of the halves thus enabling them to hold the halves without dislodging them relative to the openings in the plate through which the pit is cut.

Also these mechanically actuated clamps are associated with the pitting spoon or blade so as to automatically regulate the depth at which the blade will cut into the peach where smaller peaches than a maximum diameter may be positioned against the plates. Thus, where a smaller peach is positioned for pitting, the pitting blade will make a more shallow cut into the peach half than where a larger diameter peach is pitted. By this arrangement waste is eliminated.

Heretofore relatively thin curved blades have been used for pitting peaches on the theory that the blades will hug the pits and thus eliminate waste, which is true, but the breakage of the blades and consequent delays in their replacement are more costly than the waste.

In the present invention the blade is generally spoon shaped and rugged with similar V-shaped recesses in opposite lateral side edges with the V on its side so that the divergent edges of the blade will enter the fruit initially adjacent the stem end of the pit with the said stem end at the apex of the V. The blade always enters the stem end for either half, first cutting out one pit, then moving over and cutting out the other pit, and in each case the degree of this movement is restricted, if the peach is smaller than that for which the blade is set so as to make a shallower cut. Means is provided for quickly manually adjusting the blade to a predetermined maximum cut. Thus the blade may be set for small, medium or large peaches or for any desired grade (as to size).

Also this invention provides means for removing the pitted halves after the pits are removed. Heretofore the halves have tended to stick to the plates against which they were clamped even after the clamps were moved away. By this invention the halves are positively removed after each pitting operation should they tend to stick in place.

Heretofore some difficulty has been experienced where rigid pitting blades or spoons are used when the knife or pitting spoon strikes the pit instead of cutting into the meat. The blade may be broken, bent or otherwise injured.

By the present invention any unusual resistance to the movement of the pitting blade (in a pitting operation) that would be likely to injure the blade will result in the blade being immediately rendered inoperative in so far as that particular half is concerned. But the blade will pit the other half and also all subsequent pitting operations will be performed without stopping or slowing down the machine. This safety feature is quite important in preventing losses through breakdowns and blade replacements. While the objectionable fruit half will not be pitted, the blade will be uninjured and the unpitted half will later on be picked out by the inspectors and manually pitted.

Other objects and advantages will appear in the specification.

In the drawings,

Fig. 3 is an enlarged top plan view of the machine, showing the top in detail but omitting certain lower elements so as to not confuse the view.

Fig. 4 is a fragmentary side elevational view showing the fruit splitter blade, anvil and feed device and the operating parts thereof in detail.

Fig. 5 is a sectional view taken along line 5—5 of Fig. 4.

Fig. 6 is a top plan view of the power transmission elements for the splitter and feed device in the housing that is at the upper end of Fig. 4, the top of the housing being removed.

Fig. 7 is a sectional view taken along line 7—7 of Fig. 6.

Fig. 8 is a fragmentary detached sectional view of the splitting blade and anvil.

Fig. 9 is a sectional view taken along line 9—9 of Fig. 8.

Fig. 10 is a sectional view taken along line 10—10 of Fig. 4, showing those parts of the transmission means to the splitter and peach or fruit remover.

Fig. 11 is a sectional view taken along line 11—11 of Fig. 10 showing the elements connected with those that are shown in Fig. 10.

Fig. 12 is a front elevational view of the feed end of the machine showing the feed device only and the connection with the gear box, also several elements that connect with the splitter are shown. This view is broken in height and certain portions are broken away for clarity.

Fig. 14 is a view generally taken along line 14—14 of Fig. 13, showing the arrangement of elements in the fruit transfer means.

Fig. 15 is an enlarged fragmentary sectional view taken along line 15—15 of Fig. 14.

Fig. 16 is an enlarged fragmentary sectional view taken along line 16—16 of Fig. 14.

Fig. 17 is an enlarged fragmentary sectional view taken along line 17—17 of Fig. 14.

Fig. 18 is an enlarged side elevational view of one of the fruit clamping means of the transfer device substantially as seen along line 18—18 of Fig. 14.

Fig. 19 is a sectional view taken along line 19—19 of Fig. 18.

Fig. 20 is a fragmentary side elevational view of the lower end of the device of Fig. 18 as seen from the opposite side of Fig. 18 along line 20—20 of Fig. 19.

Fig. 21 is a sectional view taken along line 21—21 of Fig. 19.

Fig. 22 is an enlarged sectional view of the pitter and fruit clamping mechanism for holding the fruit while pitted. The pitter and fruit clamping mechanism is not indicated in Fig. 2 but is in a position to be seen from line 22—22 of Fig. 2.

Fig. 23 is a sectional view taken substantially along line 23—23 of Fig. 22 but with the omission of the frame and with the gear box added.

Fig. 24 is a sectional view taken substantially along line 24—24 of Fig. 23.

Fig. 25 is an enlarged fragmentary sectional view of a part of Fig. 24.

Fig. 28 is an enlarged fragmentary sectional view of a clutch for the pitter substantially as seen from line 28—28 of Fig. 23.

Fig. 29 is a sectional view taken along line 29—29 of Fig. 28.

Fig. 30 is an enlarged fragmentary elevational view showing the gear train to pitter blades or spoons.

Fig. 31 is a fragmentary elevational view of one side of the pitter blade as seen from line 31—31 of Fig. 30.

Fig. 32 is a semi-diagrammatic view of the gears in the gear box, the frame being indicated in dash lines.

Fig. 33 is a sectional view taken along line 33—33 of Fig. 32.

Fig. 34 is a sectional view taken along line 34—34 of Fig. 32.

Fig. 35 is a sectional view taken along line 35—35 of Fig. 32.

Fig. 36 is a sectional view taken along line 36—36 of Fig. 32.

Fig. 37 is a sectional view taken along line 37—37 of Fig. 32.

Fig. 38 is a sectional view taken along line 38—38 of Fig. 32.

Fig. 39 is a sectional view taken along line 39—39 of Fig. 32.

Figure 1:
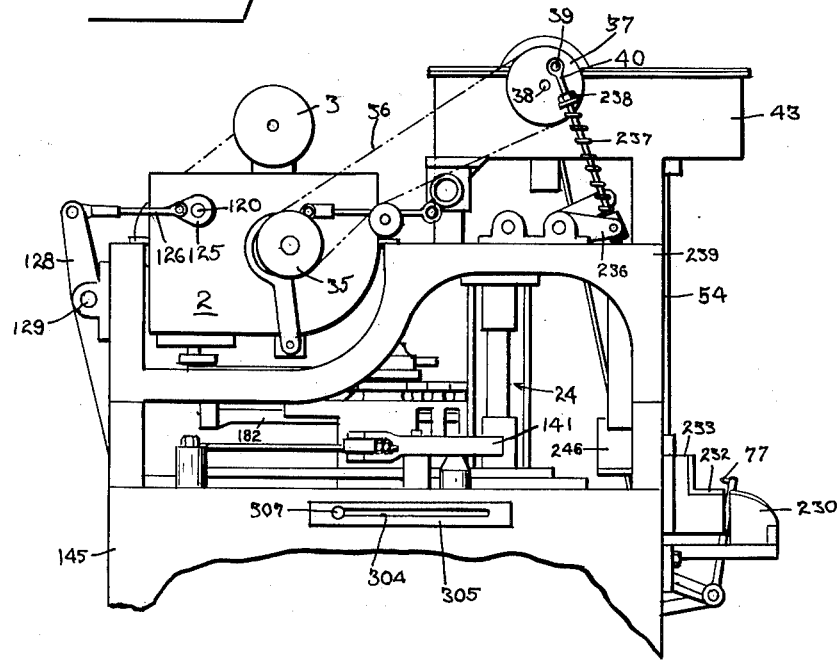
Fig. 1 is a side elevational view of the machine as seen from one side, the front of the machine or the feed end being at the right. The lower frame portion is broken away and certain parts are omitted for clarity.

In the following detailed description, the main gear box will first be described, including the elements therein, inasmuch as all power means to the various parts originate in this gear box and are synchronized so that the various operations occur at the proper time and in proper sequence. Later on, after the various parts and operations of the elements in and associated with the gear box are explained, the several operating means that handle the peach or other drupe will be coordinated and explained in detail.

*Originating means for actuating fruit clamps for halves at pitting station*

A shaft 1 rotatably extends into gear box 2 and is continuously driven in one direction by motor 3 (Fig. 3). The teeth of a pinion 4 on shaft 1 mesh with the teeth of gear 5 on a shaft 6. The teeth of a pinion 7 on shaft 6 mesh with the teeth of a gear 8 on a main cam shaft 9. Rigidly secured on shaft 9 is a cam 10 (Fig. 23). This cam 10 causes actuation of the fruit clamping arms and members during and between pitting operations, as will later be described more in detail when describing the pitting operations shown in Figs. 22 to 27.

*Originating means for pneumatically actuated clamps on fruit transfer device between splitter and pitter*

Figure 13:
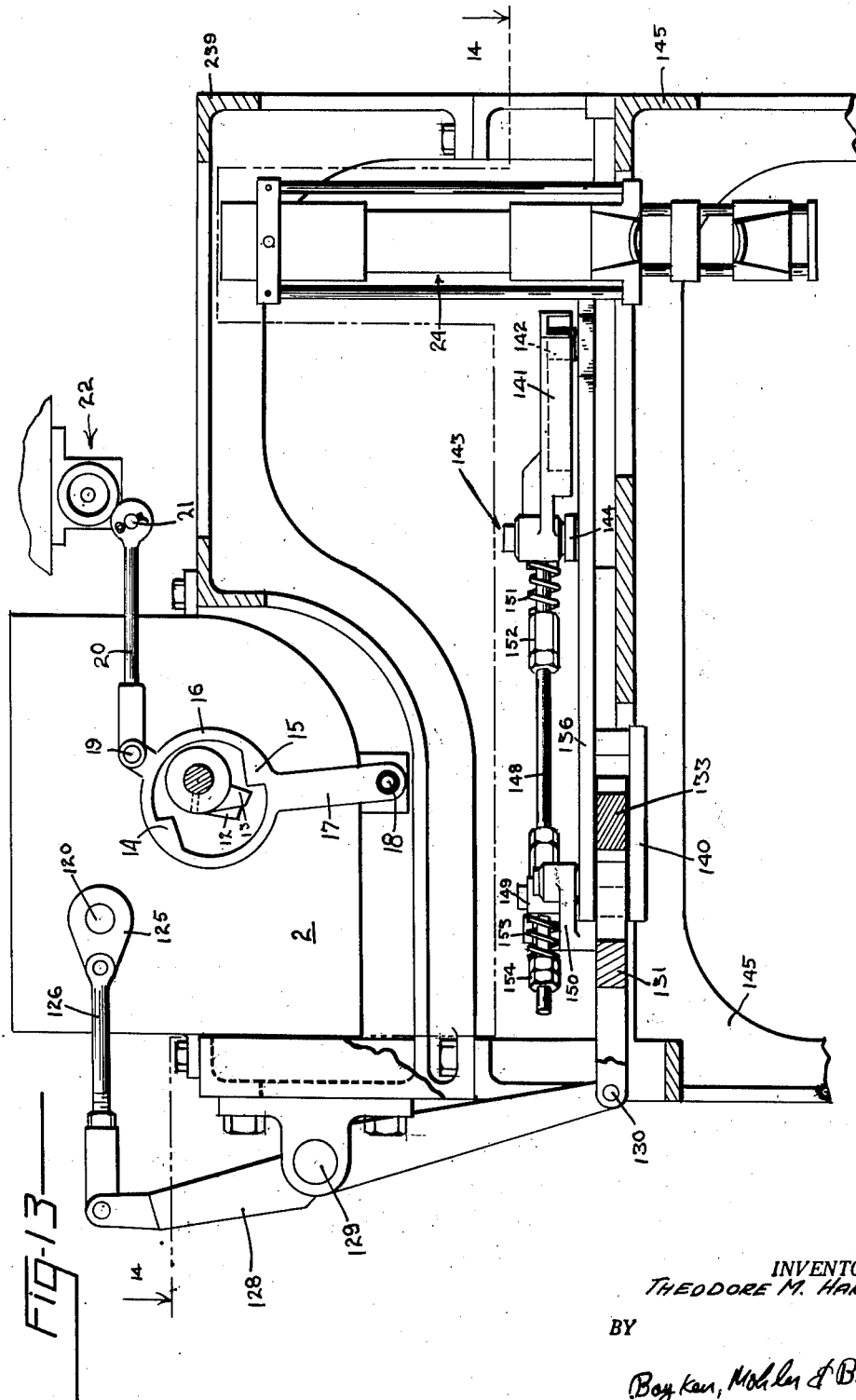
Fig. 13 is an enlarged fragmentary sectional view of the fruit transfer means only, which means is between the splitter and the pitter. The view is generally taken along line 13—13 of Fig. 3.

Shaft 9 also carries a pair of cam members 12, 13 that are adjustable on said shaft relative to each other (Figs. 3, 13, 32). The position of said members in Fig. 13 is slightly different from their relative positions as seen in Figs. 3 and 32. These members usually project from the same side of shaft 9 but may project from any side and in any degree of spacing relative to each other. Their function is to engage radially outwardly and oppositely directed laterally projecting lugs 14, 15 on an annular member 16 that is between the cams 12, 13. This member 16 is on the end of an arm 17 that is pivoted at 18 to the gear box 2 for intermittent oscillation of said annular member.

Pivotally connected at 19 to member 16 is one end of a rod 20. This rod is pivotally connected at 21 with an arm that in turn is connected at its opposite end with a conventional 4-way valve 22 (Figs. 13, 21). At one end of the generally reciprocatory stroke of rod 20 the valve 22 will be moved to open one pair of ducts 23 between a source of compressed air and a cylinder 24, the opening of said ducts into said cylinder being between pistons 25, 26 in said cylinder, thus causing said pistons to move away from each other. At the same time valve 22 will open a pair of ducts 27 (Fig. 21) to exhaust, said ducts communicating with the ends of said cylinder outwardly of the pistons.

Upon reciprocation of rod 20 to the opposite end of its stroke, the valve 22 will open ducts 23 to exhaust and will connect ducts 27 with the source 30 of compressed air, thus causing the pistons 25, 26 to move toward each other.

There are two cylinders 24 in the machine, each being identical and the air is simultaneously admitted into them and discharged therefrom in the same way through valve 22.

As will later be described in detail, the fruit clamps that hold the fruit during splitting and that carry the fruit halves from the splitter to the pitter are associated with the pistons in cylinder 24. When the pistons are caused to move toward each other, the fruit clamps will move into engagement with the fruit and when the pistons move apart, the clamps will move apart to release the fruit.

*Originating means for guillotine splitting blade*

A sprocket wheel 35 (Figs. 1, 3, 32) is secured on main cam shaft 9, which wheel connects by a chain 36 with a sprocket wheel 37 (Figs. 1, 4) that in turn is secured on one end of a shaft 38.

On sprocket wheel 37 is a laterally projecting pin 39 to which one end of a link 40 is pivoted for oscillatory and reciprocatory movement. This movement is converted into a straight vertical reciprocatory movement for intermittently reciprocating a guillotine type splitter blade as will later on be described more in detail, and which blade functions to split the peach or the like and the pit into two halves.

*Originating means for revolving turret to carry anvils below guillotine blade*

The shaft 38 rotatably extends into a Geneva gear box 43 and has a bevel gear 44 rigidly secured thereto within said box. The teeth of gear 44 mesh with the teeth of a bevel gear 45, which latter gear is secured on a vertical stub shaft 46. Stub shaft 46 is rotatably supported in a bearing that is journalled on the gear box 43 (Figs. 6, 7).

A cam 47 is secured to shaft 46 and said cam has an arm 48 that is pivotally connected at its outer end at 49 with one end of a link 50. The other end of link 50 carries a roller 51 that is positioned within a stationary cam track 52. Track 52 has a straight run or section 53 positioned between shaft 46 and a shaft 54, the latter being offset to one side of shaft 46. Track section 53 extends at right angles to a straight line drawn between the axes of shafts 46, 54.

The shaft 54 carries a Geneva gear 56 that is formed with four equally spaced radially outwardly extending slots 57 that are open at their outer ends. Corresponding arcuately extending surfaces 58 extend between the outer ends of adjacent slots.

The cam 47 has a circular outer peripheral surface 59 that is adapted to intermittently and successively engage the surfaces 58 upon revolution of shaft 46 for holding the Geneva gear 56 stationary during such engagement.

A section 60 of cam 47 is cut away to permit rotation of said Geneva gear during those times when roller 51 is carried along the track section 53 and at which time said roller will move into one of the slots 57 in said Geneva gear.

The fact that roller 51 is carried straight along the track section 53 during the time when it is in one of the slots 57 (Fig. 6) eliminates the objectionable "whip" or extremely fast movement of the Geneva gear that occurs where the pin or roller that moves into one of its slots for rotating it is carried by a wheel, disk or the like instead of the structure described. Normally when the actuating pin or roller for a Geneva gear passes through the point where it is nearest the axis of the Geneva gear, the latter is whipped about its axis too fast to be satisfactory for many operations, including the present one, inasmuch as the shaft 54 on which the Geneva gear is secured is the one that carries the anvils that in turn carry the fruit to below the guillotine type splitting blade. Too fast a rotation of the Geneva gear would tend to throw the fruit off the anvils by centrifugal force or would at least tend to dislodge the fruit. These anvils will later be described in detail, the same being a turret type structure extending radially from the axis of shaft 54.

*Originating means for moving fruit onto one of the anvils of the turret feed means that holds fruit during splitting*

Shaft 38 extends out of Geneva gear box 43 at the end opposite sprocket 37 and carries a crank arm 65 at the projecting end of the shaft. This crank arm carries a crank pin 66 to which one end of a rod 67 is pivotally secured. The other end of rod 67 is pivotally connected at 68 with the outer end of a crank arm 69. Crank arm 69 is secured at its inner end to a shaft 70.

The shaft 70 (Fig. 12) is journalled in bearing members 71 carried by the stationary frame of the machine.

An arm 75 is secured at one of its ends to the shaft 70 and extends upwardly from said shaft (Figs. 1, 2, 3, 12). The upper end of arm 75 carries a lateral projection 76 that in turn has a fruit positioning pin 77 thereon (Figs. 3, 4). This pin 77 has an oscillatory circular movement between a generally upwardly directed position and a generally horizontally directed position and moves upwardly and laterally from the former position in a direction toward one of the anvils of the turret for moving a fruit from a position engaged at its stem end by the upwardly directed pin onto one of said anvils, which anvil is the one opposite the axis of shaft 54 from the guillotine splitting blade.

*Auxiliary means including clutch for actuating guillotine splitting blade intermittently*

Referring back to the gear box 2, the gear 5 on shaft 6 has a bearing 80 secured thereto. Rotatably supported on said bearing is a cam 81, which cam carries an arm 82 projecting toward and over shaft 9 (Figs. 32, 34, 35). The face of cam 81 that is directed away from gear 5 has an annular outwardly and laterally opening cam track 83 formed therein. This track is enlarged on its radially inner side as at 84 (Fig. 34). The outer end of arm 82 normally would be supported by gravity on shaft 9 (Fig. 35).

The shaft 9 carries a cam 85 rotatable therewith and which cam carries a roller 86 that is adapted to engage arm 82 upon rotation of shafts 6, 9 relatively for rotating the cam 81 clockwise as seen in Fig. 34.

Shaft 6 has an extension 87 on one end thereof, which extension is rotatable relative to shaft 6. This extension has a latch member 88 pivotally secured thereto at a point intermediate its ends, and which point is spaced radially outwardly of the axis of shaft 6.

One end of latch 88 has a roller 89 that is adapted to extend into the cam track 83 and which roller, when inactive, is in the enlarged portion 84 of the track (Fig. 35).

The other end of latch 88 is in the form of a hook 90 that is adapted to engage a projection 91 on bearing 80 when the roller is in the cam track 83 (Fig. 34) but said hook will not engage the projection when the roller is in enlargement 84 (Fig. 35).

The cam 85 has an annular peripheral surface 92 that fits into a concavely formed arcuate portion 93 that is formed in the peripheral outer side of a radially outwardly projecting cam portion 94 that is integral with extension 87. Thus cam 85 and extension 87 are locked together until cam 85 rotates to a point where its peripheral margin is cut away, as at 95. Then the cam 94 is free to rotate.

Cam 85 also carries an axially projecting flange 96 that has a section cut away as at 97. When flange 96 is adjacent extension 87 it will slightly overlap the cam track tending to keep the roller or pin 89 on latch 88 in the enlarged portion 84 of the cam track 83 and out of the narrowest major length of said cam track. Also gravity on latch 88 tends to keep the pin 89 in said enlarged portion.

The cam 94 carries a projection 98 that is adapted to engage the flange 96 on cam 85 when the pin 89 is opposite enlargement 84, thus stopping cam 94 when said flange is in a position to hold the pin in said enlargement.

In operation the extension 94 will make one revolution through engagement between latch 88 and projection 91 when the cam 85 permits said cam 94 to rotate.

Figure 2:
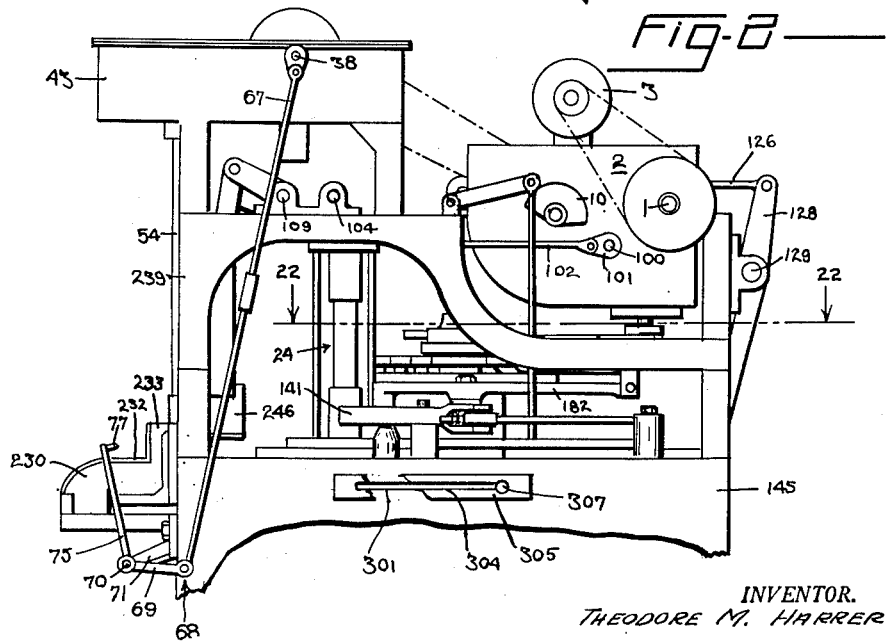
Fig. 2 is a side elevational view of the machine as seen from the side opposite that shown in Fig. 1.

Extension 87 has a stub shaft 100 projecting axially thereof (Figs. 2, 32, 33) on which is secured a crank 101. The outer end of crank 101 is pivotally secured to one end of a rod 102 (Figs. 2, 3). The other end of rod 102 is pivotally connected to the outer end of a crank 103 (Figs. 3, 10, 12) that in turn is secured on a rotatable shaft 104 (Fig. 10). This shaft 104 also has another crank 105 secured thereto. The outer end of crank 105 is pivotally connected with one end of a rod 106 and the opposite end of rod 106 is slidable longitudinally through a block 107 that in turn is pivotally secured between the outer ends of arms 108 of a yoke, the inner end of which is secured to a shaft 109 (Figs. 3, 10, 12). The rod 106 projects beyond block 107 and has a pair of lock nuts 110 adjustably secured on the projecting end.

The function of this shaft 109 is to actuate the guillotine splitter blade, as will later be described more in detail to coordinate its action with that of the link 40 that is connected with ratchet gear 37.

Means for reciprocating air cylinders that carry fruit from splitter to pitter Returning to gear box 2, the shaft 9 has a cam 112 secured thereto, which cam is formed with a pair of diametrically opposite gear segments 113 that project axially from one side of said cam (Figs. 32, 38). The cam is cut away adjacent segments 113 for a slightly longer distance (Fig. 38), as indicated at 114, and the remaining unrelieved sections of the cam between the cut away portions have annular peripheral surfaces 116 that are radially outwardly of the outer ends of the gear teeth of segments 113.

Adjacent shaft 9 is a shaft 120 that has a cam 121 rigid therewith (Figs. 32, 36). This cam has concavely curved diametrically opposite peripheral surfaces 122 that are adapted to slidably fit the surfaces 116 of cam 112.

Adjacent cam 121 is a fully annular gear 123, the teeth of which are adapted to engage the teeth of segments 113 whenever the shaft 9 is rotated to bring said segments to gear 123. This meshing will occur only when the portions of cam 121 between surfaces 122 are in the relieved sections 114 of cam 112. Thus shaft 120 will be locked between rotations thereof by segments 113 and shaft 120 will be rotated at set intervals by said segments.

One end of shaft 120 has a crank 125, the crank pin being pivotally connected with one end of a rod 126 (Figs. 1, 3, 32). This rod 126 will be intermittently oscillated and reciprocated by rotation of crank 125.

The opposite end of rod 126 pivotally connects with one end of a lever 128, which lever is pivotally supported intermediate its ends on a pivot 129 (Fig. 13). The end of lever 128 opposite rod 126 is pivotally connected at 130 to one end of a pusher plate 131 (Figs. 13, 14) which pusher plate reciprocates in its plane and is pivotally connected at 132 (Figs. 14, 17) at two points to a horizontally elongated arm 133 having oppositely outwardly extending forked ends 134 formed with oppositely outwardly opening slots 135 therein.

A pair of horizontal parallel spaced side members 136 extend across the forked ends 134 and each member 136 has a pin or roller 139 extending into one of the slots 135 (Figs. 13, 14, 15, 16). A bottom strip 140 is connected at its ends with each member 136 and extends below said forked ends. Pins 139 connect with strip 140.

The members 136 carry the air cylinders at their forward ends, and which cylinders carry the fruit clamping members hereinbefore generally mentioned.

Reciprocation of members 136 will thus be effected intermittently in opposite directions by rotation of the crank 125 on shaft 120.

This reciprocatory movement is modified by an oscillatory swinging of the members 136 laterally between the ends of their stroke so as to swing the air cylinders (and fruit clamping members thereon) oppositely outwardly and then back again.

The means for causing this oscillatory movement comprises a pair of arcuately extending inverted channel members 141 (Figs. 13, 14, 15), each of which receives a roller 142 that in turn is carried by the member 136 adjacent thereto.

Each channel member 141 is pivotally connected at one of its ends by a pivot 143 to a bracket 144 (Fig. 15) that is in turn rigidly secured to the lower frame member 145 of the machine (Figs. 13, 14, 15).

Each channel member 141 has a right angle extension 146 at the end adjacent pivot 143, which extension projects outwardly relative to the center of the machine. The outer end of each extension 146 pivotally supports a block 147 through which a rod 148 extends through a block 149, which block in turn is pivotally secured to a link 150 intermediate the opposite ends of the latter. One end of each link 150 is pivotally secured to the end of member 136 (Figs. 14, 16) adjacent thereto, while the opposite ends of links 150 are pivotally secured to the frame 145.

A spring 151 reacts between each block 147 and a sleeve 152 on rod 148 to provide some yieldability between the channel members 141 and the rods 148, which in turn permits corresponding yieldability between the air cylinders 24 and said rods.

If desired, springs 153 may be interposed between blocks 149 and nuts 154 that are on the ends of rods 148. It is also pertinent to note that lock nuts 155 are at the opposite ends of rods 148 to provide adjustable stops for engaging blocks 147.

Originating means for oscillating fitting spoon or blade and means for oscillating said spoon or blade Returning to gear box 2, the shaft 9 has a cam 160 rigidly secured thereto (Figs. 32, 37). This cam somewhat resembles cam 112 in structure in that it carries a pair of gear segments 161 thereon and which segments are offset to one side of the cam. These segments are spaced apart but are both positioned at one side of the axis of shaft 9, and cam 160 is cut away at 162 adjacent each of said segments. Between the cut away portions 162 the cam 160 has a short circular peripheral surface 163 and the remaining surface 164 at the side of the cam opposite surface 163 is a continuation of the latter except for the cut away portions.

A cam 165 (Figs. 32, 33) on shaft 6 is substantially identical with cam 121 of Fig. 36, having radially outwardly directed concave peripheral surfaces that slidably engage convex surfaces 163, 164 of cam 160 when the gear segments 161 are out of mesh with the teeth of a gear 166 that is rigid with cam 165. The cam 165 and gear 166 are rotatable relative to shaft 6.

A bevel gear 167 is rigid with cam 165 and the teeth of this gear are in mesh with the teeth of a bevel gear 168 on the upper end of a vertical shaft 169, which shaft is rotatably supported on the bottom of the gear box 2 (Fig. 33).

The lower end of shaft 169 carries a crank 170, which crank has a crank pin 171 that in turn is pivotally connected with a lever 172 intermediate the ends of the latter. One end of lever 172 is pivotally connected by a pivot 173 with one end of a link 174. The opposite end of link 174 is pivotally connected with another link 175 intermediate the ends of the latter. One end of link 175 is pivotally connected to frame 145 at 176.

The other end of link 175 is pivotally connected with a block 177 that in turn is slidable on a rod 178. The block 177 is yieldably held against nuts 179 at one end of rod 178 by a coil spring 180. Spring 180 reacts between said block and a pair of adjustable nuts 181 threaded on said rod.

The opposite end of rod 178 slidably extends through one end of a long lever 182. The end of this lever at rod 178 is yieldably held against a collar 183 that is adjustably secured on rod 178. A spring 184 reacts between said lever 182 and a pair of nuts 185 on the end of rod 178 (Figs. 22, 23, 24). The lever 182 is pivoted intermediate its ends at 186 to a supporting member 187 that is rigidly secured to frame 145 (Figs. 23, 24, 30).

The end of lever 182 opposite rod 178 is pivotally connected to one end of a link 190 (Fig. 22). The other end of said link is pivotally connected to a vertical shaft 191 (Fig. 30) intermediate the ends of said shaft.

This shaft 191 is rotatable in a frame 192 that swings about a vertical shaft 193 (Figs. 22, 30). Shaft 193 is secured at its lower end to lower frame 145. The lower end of shaft 191 carries a pitting spoon or blade 194.

From the foregoing it will be seen that the intermittent rotation of shaft 169 through the medium of gear segments 161 will cause a swinging of lever 182 in one direction, and then in the opposite direction with a relatively long interval between such opposite swinging. This will later be described more in detail in describing the operation of the machine as a whole.

The end of lever 172 that is opposite pivot 173 is rigid with a rack 200. The teeth of rack 200 are in mesh with the teeth of a gear 201 (Figs. 22, 23, 29). Gear 201 is on a vertical shaft 202, which shaft is rotatably supported on frame 145 (Fig. 30). Gear 201 is rotatable on shaft 202.

Below gear 201 is a gear 203 (Fig. 29) that is also rotatable on shaft 202. This gear 203 is in mesh with gear 204 on shaft 193. Shaft 191 carries a gear 205 at its upper end and gears 204, 205 are connected by an intermediate gear 206 on a stub shaft 207 which is carried on frame 192. Thus gears 203, 204, 205 and 206 form a train of gears through which shaft 191 that carries the pitter blade 194 is intermittently rotated.

*Safety means for disconnecting pitting blade from power and for automatically resetting same*

The gears 201, 203 are releasably connected for rotation together by means of a releasable clutch in the form of a tooth 213 rigid with gear 203 and a yieldable frame 208 that is connected with gear 201. Springs 209 react between frame 208 and a frame 210, which frame 210 is rigid with gear 201. Thus upon a predetermined and unusual resistance to rotation of the blade 194, the tooth 213 will slip out of its recessed seat 211 in frame 208 and the blade 194 will be disconnected from power for driving it.

To reset the tooth 213 in its recess 211, a quadrant 212 is provided, the teeth of which quadrant are in mesh with the teeth of gear 203. If the tooth 213 is connected with frame 208, as seen in Fig. 28, the quadrant will merely oscillate about its pivot 215 according to the oscillation of gear 203.

As best seen in Fig. 22, the end of the quadrant 212 that is opposite its teeth is formed with an irregularly shaped opening 217 into which a pin 218 projects. The pin 218 is rigidly secured on a crank arm 219 that in turn is rigidly secured to pivot 171. Pin 171 is rigid with crank 170. This opening 217 has two straight inner sides 220 and 221.

When the tooth 213 is out of the recessed seat 211, the swinging of lever 182 will swing move the train of gears, including the pitting blade, to a position midway between the ends of the stroke of frame 192, and at this point the cam 165 (Fig. 33) is held by cam 160 (Figs. 32, 37) against actuation of bevel gear 167, said cam 166 being at this time seated against the peripheral surface 163 or 164 of cam 160. The quadrant 212 is also inoperative at this time. However, rack 200 will continue to operate and the movement of the rack will rotate gear 201, which is disconnected from the gear 203. The pin 218 on crank 219 will also continue to revolve and will strike either surface 220 or 221 according to the side at which the pitter blade was positioned when the gears 201, 203 become disconnected, thereby resetting the tooth 213 in recess 211 of frame 208. Stops 225 on stationary supporting member 187 are adapted to engage stops 226 on gear 203 at a point in this operation. The gear 203 will normally oscillate through about a half circle between stops 225.

*Initial positioning of fruit to be split and pitted and means for so positioning the fruit*

In operation the operator positions a drupe, such as a peach, on an arcuate impaling blade 230 over which the positioning pin 77 oscillates generally following the contour of the impaling edge of said blade (Figs. 1, 2, 4). This latter edge is directed upwardly and outwardly relative to the main body and is about a quarter of a circle as best seen in Fig. 4 and is formed about a radius having a different center than that about which pin 77 moves, so that the pin will move progressively closer to the uppermost edge of the blade 230 (Figs. 1, 2) during the period in which the pin pushes the drupe upwardly along said blade and onto the horizontally extending anvil, as will later be described. By reason of this structure the drupe will tend to be progressively forced deeper onto the blade 230 as the same is pushed along the latter. The pin 77 is on the arm 75 that has already been described, and which arm oscillates from a generally horizontally extending position with pin 77 directed upwardly to a generally vertical position with the pin directed horizontally away from the operator.

The stem end of the peach 231 (in dotted line in Fig. 4) will be directed downwardly against pin 77 with the suture of the peach in the plane of blade 230 and with the pit substantially on the edge of the blade.

*Turret between initial fruit positioning means and splitter for transferring fruit to splitter and for holding fruit during splitting*

The lower end of the intermittently revolvable shaft 54 carries a turret in the form of four equally spaced vertically positioned blade-like anvils 232. Each of these anvils (Figs. 4, 14) has a vertical leg 233 bolted to a support 234 in a position extending tangentially of the shaft 54. These legs 233 have sharpened vertical edges that face outwardly relative to said shaft.

The blade-like anvil portion 232 of each blade extends horizontally relative to the leg portion 233 and is coplanar therewith, and the upper edge of each anvil is recessed to provide a V-shaped groove 235 (Figs. 8, 9).

The shaft 54 is positioned so that the anvils 232 will intermittently be moved into coplanar edge to edge position relative to blade 230 with the upper edge of blade 230 in horizontal alignment with the upper edge of the anvil.

The turret will be stationary when arm 75 and pin 77 push the peach onto the anvil that is adjacent blade 230 (Fig. 4). The arm 75 then immediately swings back to generally horizontally extending position so the pin 77 will be ready to engage the stem end of the pit of another peach or drupe, and the turret then makes a quarter turn by reason of the action of the Geneva gear in box 43 so as to position the next anvil for receiving the next fruit. It will be seen that two movements of the turret will carry a fruit from the receiving position of the anvil to below the guillotine splitting blade which is at the side of the turret opposite blade 230. It will also be seen that each peach will be impaled on the vertical leg 233 of the anvil during said rotation and during splitting, as well as being impaled on the anvil.

*Means for positioning pit on anvil and means for actuating splitter blade*

After each quarter rotation of the turret, the rod 40 (Fig. 4) on sprocket wheel 37 will be moved downwardly with rotation of the sprocket wheel. The lower end of rod 40 slidably extends through a block 235 that in turn is pivotally carried by the outer end of a link 236 (Figs. 4, 12). A spring 237 is interposed between block 235 and a collar 238 that is adjustable on rod 40. Link 236 is secured to shaft 109 that in turn is rotatable in bearings carried on stationary upper frame 239 which is rigid with frame 145.

Secured on shaft 109 is an arm 240. The outer end of arm 240 is pivotally connected at 241 with the upper end of a link 242. The lower end of link 242 is pivotally connected at 243 with a vertical slide 244 that in turn is slidably held in opposed spaced guides 245.

The lower end of slide 244 is secured to the upper edge of the guillotine splitter blade 246. Blade 246 is vertically reciprocable to and from the anvil that is therebelow and that is coplanar therewith inasmuch as each intermittent movement of the turret will carry one of the anvils to such coplanar relationship with the splitter blade, and each anvil so moved will remain stationary below said blade during a reciprocation of said blade.

The lower edge of blade 246 is sharpened and it likewise has a sharpened vertical edge 248 that is adapted to move along the cutting edge of leg 233 and closely alongside the latter.

When a peach is carried around the turret on one of its anvils to below blade 246, the latter will descend until its edge engages the upper edge of the pit, and it will continue to move downwardly under the influence of rod 40 until the pit is firmly held between the anvil and the blade 246. The lower edge of the pit will be in groove 235 so the pit will not be able to slide to either side of the anvil. However, the rod 40 does not cause the blade 246 to split the peach and pit, although it may tend to do so, particularly if the pit is split.

When shaft 104 is intermittently oscillated by crank 101 the nuts 119 on rod 106 (the latter being on arm 105 that is secured on shaft 104) will engage the arms 108 of the yoke on shaft 109 after the initial positioning of the pit between the anvil and said blade, to cause a powerful sharp downward drive of blade 246 through arm 240 and link 242 to split the peach and pit.

*Fruit clamps on air cylinders for holding fruit during splitting and during transfer of halves to pitter*

After the peach pit is yieldably held by blade 246 in its initial movement by rod 40 and before the blade splits the peach, a pair of peach engaging clamps 250, 251 (Figs. 14, 18, 19) will engage each of the opposite sides of the peach at opposite sides of the blade 246.

Clamps 250 are the upper ones of each pair, while clamps 251 are the lower ones. The actuation of one pair will be described in detail, it being understood that both pairs operate simultaneously and similarly so that the opposite halves of the peach will be held by said clamps for transfer thereof to the pitter after the peach is bisected.

Clamp 250 of each pair is carried by rods 252 at opposite sides of air cylinder 24 and are pivotally connected at 253 to opposite ends of a cross head 254. This cross head is above cylinder 24 and is centrally pivoted at 255 to piston rod 256. The piston rod 256 is connected with the upper piston 25.

The lower clamp 251 of each pair is connected by piston rod 257 with the lower piston 26 in cylinder 24. Both clamps 250, 251 are slidably supported on a pair of parallel rods 258 which rods are rigid with cylinder 24.

Between clamps 250, 251 is a cross element 259 that is stationarily secured to rods 258.

Clamps 250, 251 will thus move toward and away from each other under the influence of air in cylinder 24 between the pistons 25, 26 or on the opposite ends of the cylinders according to the position of four way valve 22.

The operation of value 22 is synchronized through the gears in gear box 2, as already described, with that of the splitting blade to move the clamps 250, 251 into engagement with the halves of the peach at opposite sides of the guillotine splitting blade after the pit is firmly held between said blade and the anvil therebelow, but not before, and this grip of the clamps will be a yieldable one under air pressure.

To insure positive positioning of the clamps without dislodging the peach, irrespective of which clamp may first engage the fruit, the two clamps are connected by links 260, 261 and 262 (Fig. 20).

Link 261 is between links 260, 262 and is centrally pivoted at 263 to the stationary cross piece or element 259. Links 260, 262 are respectively pivotally connected at one of their ends to opposite ends of link 261 at 264 and 265, while their opposite ends are connected to the clamps 251, 250 at 266, 267.

The links 260, 262 are of equal length and pivots 266, 267 are equally spaced from pivot 263, while all three pivots 263, 266, 267 are in a vertical line parallel with rod 257 and alongside the latter.

By this connection if, for example, an irregularity in the peach or a sticking of one of the clamps should occur, and one of said clamps should engage the peach before the other, the latter will be moved into engagement with said peach without further movement of the clamp that first engaged the peach, whereby the peach will be firmly gripped without moving the same. This is a very desirable and is a relatively important feature since the peach should be at exactly the same position at the pitting station as at the splitting station.

The outer ends of clamps 250, 251 are curved to provide concave opposedly facing surfaces 268 (Fig. 18) that generally conform to the curvature of the outer sides of the peach. These surfaces are formed with arcuate ribs 269 (Fig. 19)

and openings 270 are also formed in said outer ends to break any suction that might occur. The ribs tend to prevent packing of peach fuzz on the clamps, which otherwise occurs.

*Means for transferring halves from splitter to pitter while halves are held by clamps*

After the splitting blade has descended and split the peach and pit in the plane of their sutures, the blade 246 moves upwardly and the turret on shaft 54 revolves a quarter turn to position the anvil with another peach thereon to below blade 246.

The halves of the previously split peach will be clamped between the clamps 250, 251 and the next action of these clamps will be a movement of said pairs oppositely outwardly by reason of the arcuate channel members 141 in which the rollers 142 on reciprocating members 136 are received (Fig. 14). These members 136 carry the cylinder 24 and clamps 250, 251 (Figs. 14, 19). As already explained, members 136 are reciprocated by rotation of shaft 120 in gear box 2 which is synchronized with the other elements.

At the forward end of the stroke of members 136, after their oppositely outward movement, the clamps will be moved toward each other under the control of the rollers 142 in channel members 141 to bring the opposedly facing cut faces of the peach halves against opposite sides of a box 271 (Figs. 4, 14, 22) within which the pitter blade 194 is intermittently rotated.

Said opposite sides of box 271 are apertured at 272 sufficiently to permit the pitter blade to revolve therethrough and to cut out the half of the pit that is registered over each opening 272.

*Peach holding means for holding halves during pitting*

As soon as the peach halves 280 (Fig. 27) are positioned over the openings 272, said halves are clamped against the plates having openings 271 therein by means of a pair of clamps 273.

Each of the clamps 273 comprises a long arm 274 and a short angularly extending arm 275 rigid therewith, each of said clamps being pivoted at the juncture between said arms by a pivot 276. The outer end of each arm 274 pivotally carries a curved clamping member 277 having its concave side adapted to substantially fit against the outer side of a peach, each member 277 being pivoted centrally at its convex side to the long arm at 278.

Each of clamps 273 also has an angularly extending arm 281, the outer end of which is pivotally connected at 282 (Fig. 27) with a block 283 that in turn is pivotally connected by pivot 284 (Fig. 23) to one end of a rod 285. The opposite end of rod 285 is slidable through a block 286 and an expansion coil spring 287 reacts between block 286 and adjusting nuts 288 on said rod adjacent pivot 284.

Figure 27:
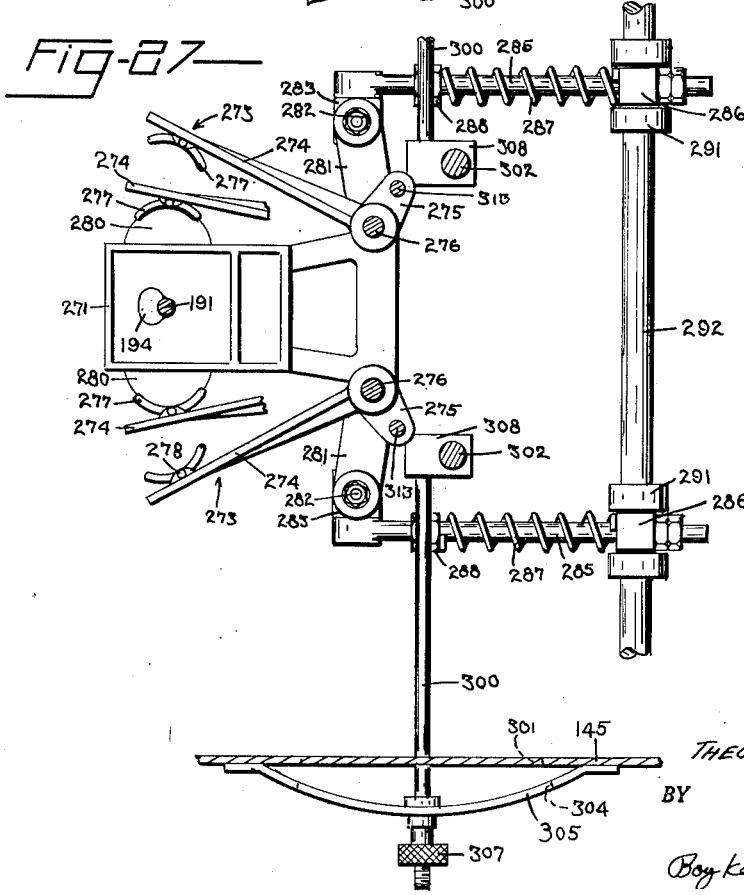
Fig. 27 is a fragmentary sectional view taken along line 27—27 of Fig. 23.

Block 286 is pivoted at 290 to one end of an arm 291. The other end of arm 291 is secured to shaft 292 (Figs. 23, 27). Shaft 292 also carries an arm 293 rigid therewith, and the outer end of arm 293 is pivotally connected to rod 294 (Fig. 23). The other end of rod 294 pivotally connects to one end of a link 295 while the opposite end of link 295 is pivoted at 296 to frame 239.

A roller 299 is also carried by link 295 at its outer end (Figs. 3, 23) and which roller constitutes a cam follower that is adapted to engage cam 10 on shaft 9 for intermittently oscillating link 295 and reciprocating rod 294 for swinging the clamps 273. The cam is synchronized through the gears in box 2 with the arms 250, 251 to engage the peach halves just after the halves are brought over the apertures 272.

The clamping members 277 being pivoted will automatically adjust themselves to the peach halves so as to hold them over the apertures without dislodgment after the transfer clamps 250, 251 are removed.

*Means for adjusting the depth of cut of the pitting spoon or blade*

The depth of cut of the pitting blade 194 may be manually regulated to give the proper cut for peaches of substantially the same size, as occurs where the peaches are graded prior to pitting.

Figure 26:
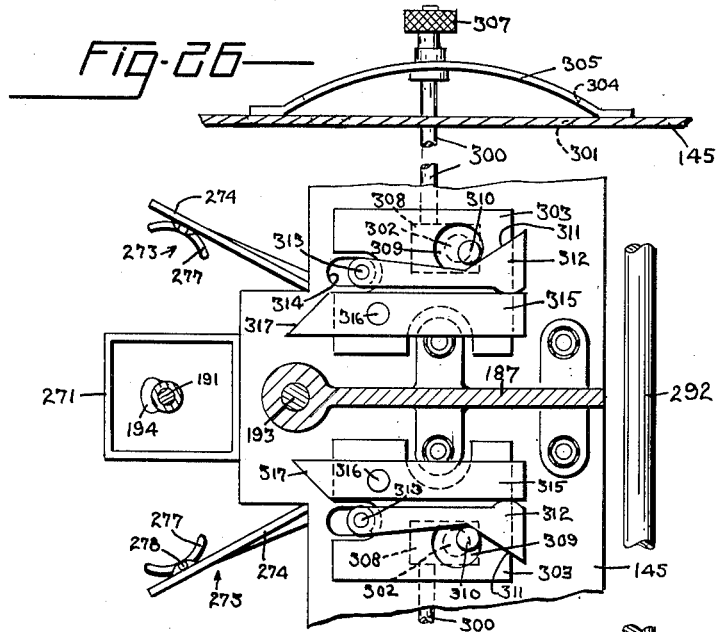
Fig. 26 is a fragmentary sectional view taken substantially along line 26—26 of Fig. 23.

The means for doing this comprises a rod 300 for each of the clamps 273. Each rod 300 extends through a slot 301 (Figs. 1, 2) in frame 145 for swinging the rod about a pivot 302 carried by plate 303 that is secured to frame 145 (Figs. 23, 26). The pivots 302 are between opposite sides of frame 145 and the outer end of each rod 300 projects outwardly of frame 145 and through a slot 304 in an arcuate member 305 that is secured to said frame and to which member said rod may be releasably secured in adjusted position by a thumb nut 307.

Each pivot 302 is offset to one side of the axis of rod 300 by a block 308 that connects the pivot with the rod.

One end of pivot 302 has a concentric enlargement 309 that carries a pin 310 offset to one side of the axis of said pivot. Thus, upon swinging each rod 300 the pivot 302 will be rotated causing pin 310 to revolve about its axis.

Upon so revolving the pin 310 in one direction, it will engage the inclined face 311 of a lever 312, which lever has a pivot 313 at one end, and which pivot is rotatable and slidable in a slot 314 formed in frame 145 (Figs. 22, 26). This movement of pin 310 against said surface 311 will move the end of the lever opposite pivot 313 toward and away from the axis of pin 302. This latter end of lever 312 will in turn engage one end of a lever 315, to cause lever 315 to swing on its pivot 316. Pivot 316 is intermediate the ends of lever 315. The end of lever 315 opposite the one engaged by lever 312 is cut off at an angle providing a slanted end surface 317 (Figs. 22, 26).

The end surfaces 317 of levers 315 are respectively adapted to be engaged by pins 318 that are each carried by a plate 319 (Figs. 22, 23). Each plate 319 is rigid with the frame 192 that swings about the axis of shaft 193. In this way the swing of the frame 192 that carries the pitting blade may be limited according to where the pins 318 engage the slanted end surfaces of levers 315.

If the peaches are large, the levers 315 are set so that the blade 194 will swing farther into the openings 272 than if the peaches are smaller. Thus there is no unnecessary waste in pitting.

*Automatic control for depth of cut of pitting blade*

The construction as above described not only provides for manual adjustment of the depth of cut of the blade, but the same provides for an automatic control for smaller peaches than the maximum size for which the blades are manually adjusted.

The pivots 313 are connected with the arms 275 that in turn are respectively rigid with each of the clamps 273 as already described. The swinging of clamps 273 will cause pins 313 to move in slots 314 longitudinally thereof and will move the levers 312 so that the surfaces 311 will engage pins 310.

If, for example, the mechanism including levers 315, is set for peaches having a maximum diameter of say 2½ inches, then nothing will occur to change the swing of the pitting blade when such or even larger diameter peaches are pitted. But if a peach of 2¼ inches in diameter is positioned against the box 271, then the clamping arms 274 would swing closer together thereby pulling the levers 312 along slots 314 so as to cause pins 310 to engage surfaces 311 and swing the ends of the levers opposite pivots 313 in a direction to pivot the levers 315 so that their slanted ends 317 would engage pins 318 at points where the pins would restrict the movement of the pitting blade into the openings 272.

*Positive means for removing pitted peach halves from pitting openings*

Should a peach half 280 become stuck over either of the openings 272 in box 271, a vertically reciprocable rod 325 having laterally projecting feet 326 at its lower end will knock the stuck half or halves off the box 271.

One foot 326 is at each side of the box 271 and both feet will simultaneously move downwardly across openings 272 upon downward movement of rod 325.

The upper end of rod 325 is slidably held in a guide 327 having a slot 328 in one side through which an ear 329 on said rod projects.

Ear 329 is pivotally connected with one end of a link 330, while the opposite end of said link is pivotally connected at 331 to one arm of a crank lever 332. Crank 332 is pivotally supported at 333 to a plate 334 that in turn is rigidly carried by frame 239 (Fig. 11).

The other arm of crank 332 is pivotally connected at 340 with one end of a rod 341. The other end of rod 341 is pivotally connected to a crank arm 342 that is in turn secured on shaft 104.

As has heretofore been explained, shaft 104 is oscillated on its axis through its connection by rod 102 with crank 101 on shaft 100 that in turn extends into gear box 2.

The reciprocation of rod 325 is synchronized with clamps 272 to move the feet 326 across the outer sides of the plates having openings 272 therein just after the clamps 273 release the halves 280. Thus if either or both halves would tend to stick onto said plates, the feet 326 would positively remove them.

*Pitting blade*

The pitting blade is generally spoon-shaped and is substantially a vertically disposed section of a hollow sphere whereby the concave side will face laterally. The upper end of the blade is secured to a downward extension of shaft 191, which extension is in turn removably secured to shaft 191.

The opposite laterally facing edges of the section are similarly cut inwardly from the upper and lower ends of said section to form convergently extending cutting edges 346 with their convergent ends about centrally of the height of the blade. The apex or convergent ends of said edges will normally be about even with the stem end of the fruit pit and will be the following ends during the pitting operation. The slanted edges will tend to shear the flesh of the fruit from the pit and the blade will enter the fruit at the divergent spaced ends of the cutting edges.

In operation, the blade will first move through one half from its stem end to cut the half of the pit therefrom. Then the blade will oscillate back to starting position and will be swung over to the other half and cut its pit half therefrom, starting from its stem end.

I claim:

1. In a machine of the character described, a plurality of vertical disposed peach supporting blades each having a horizontally extending upper edge, means for positioning a peach on each of said blades with the pit substantially on said upper edge and with the suture of said peach coplanar with the blade, a vertically reciprocable vertically disposed splitting blade having a lower cutting edge, means for successively moving said peach supporting blades with a peach on each blade into a position below said splitting blade and coplanar with the latter, and means for reciprocably moving said splitting blade vertically in its plane substantially to and from each peach supporting blade upon the latter moving into said position in which it is coplanar with said splitting blade for splitting the peach supported on said peach supporting blade.

2. In a machine of the character described, a plurality of vertically disposed peach supporting blades, each being formed with an upper edge adapted to substantially engage the pit of a peach impaled on said upper edge in the plane of the suture of such peach, blade carrying means supporting said blades in positions extending generally radially from a central vertical axis and equally spaced from said axis and from each other, means for intermittently rotating said blade carrying means about said axis for moving said blades and peaches thereon in an annular path thereabout, a vertically disposed splitting blade over said path and extending radially of said axis, the lower edge of said blade being sharpened, means supporting said splitting blade for vertical reciprocable movement toward and away from the peach supporting blade therebeneath during the interval between movement of said peach supporting blades in said path, one of said peach supporting blades being coplanar with said splitting knife during each of said intervals, and means for intermittently causing said reciprocable movement during each of said intervals whereby the peach on each blade moved to a position below said splitting knife will be split by the latter.

3. In a machine of the character described, a plurality of vertically disposed peach supporting blades each having a free upper edge, means for positioning a peach on each of said edges with the pit substantially on said edge and with the suture of the peach in the plane of the blade supporting the same, a vertically reciprocable vertically disposed splitting blade having a lower cutting edge, means for successively and intermittently moving said peach supporting blades to a position below said splitting blade and substantially coplanar with the latter, means for reciprocably moving said splitting blade vertically in its plane substantially to and from the upper edge of each peach supporting blade intermittently positioned therebelow for splitting a peach on such latter blade, including an arm supported for oscillatory movement for moving a peach onto each of said peach supporting blades at a point spaced from the said splitting blade.

4. In a machine of the character described, a vertically positioned peach supporting blade having a horizontally extending upper edge formed with a central upwardly opening groove extending longitudinally thereof, means for positioning a peach on said blade with one edge of the pit positioned within said groove, a vertically reciprocable splitting blade coplanar with said peach supporting blade and coplanar with a vertical plane bisecting said groove longitudinally of the latter, means supporting said splitting blade for reciprocable movement substantially to said peach supporting blade and through a peach on said latter blade, and means for so reciprocating said splitter blade.

5. In combination, a whole peach positioning means adapted to support a whole peach thereon in a predetermined position, a splitter for splitting whole peaches including the pits, a pitter for removing the pit halves from the halves of peaches split by the splitter, a transfer device between said positioning means and said splitter for transferring a whole peach on said positioning means to said splitter and a transfer mechanism between said splitter and said pitter for transferring the peach halves from said splitter to said pitter, said splitter including a vertically reciprocable guillotine type splitting blade and a peach supporting blade therebelow and coplanar thereto, said transfer device including said peach supporting blade, and means supporting said peach supporting blade for movement to and from said position below said splitting blade with a whole peach supported thereon during said movement to said last mentioned position, said transfer device further including a stationary blade in coplanar lateral edge to edge relation with said peach supporting blade when said latter blade is moved to a position and from under said splitting blade, said stationary blade being adapted to support a whole peach impaled on its upper edge, and means for pushing a peach so impaled from said stationary blade onto said peach supporting blade.

6. In combination, a whole peach positioning means adapted to support a whole peach thereon in a predetermined position, a splitter for splitting whole peaches including the pits, a pitter for removing the pit halves from the halves of peaches split by the splitter, a transfer device between said positioning means and said splitter for transferring a whole peach on said positioning means to said splitter, a transfer mechanism between said splitter and said pitter for transferring the peach halves from said splitter to said pitter, said pitter including a blade supported for movement around each of said pit halves and pitter actuating means for so moving said blade, a source of power and power transmission means cooperatively connecting said transfer device, splitter transfer mechanism and pitter actuating means for automatically splitting and pitting peaches and for transferring such peaches between said positioning means and splitter and between said splitter and pitter upon peaches being successively positioned on said peach positioning means, means for rendering said pitter actuating means only inoperative for said movement thereof upon said blade meeting with a predetermined resistance in a peach half to said movement, and means for automatically rendering said pitter actuating means operative for said movement for automatically pitting subsequent peach halves presented to said pitter.

7. In combination, a whole peach positioning means adapted to support a whole peach thereon in a predetermined position, a splitter for splitting whole peaches including the pits, a pitter for removing the pit halves from the halves of peaches split by the splitter, a transfer device between said positioning means and said splitter for transferring a whole peach on said positioning means to said splitter, a transfer mechanism between said splitter and said pitter for transferring the peach halves from said splitter to said pitter, said pitter including a blade supported for movement around each of said pit halves and pitter actuating means for so moving said blade, a source of power and power transmission means cooperatively connecting said transfer device, splitter transfer mechanism and pitter actuating means for automatically splitting and pitting peaches and for transferring such peaches between said positioning means and splitter and between said splitter and pitter upon peaches being successively positioned on said peach positioning means, means for rendering said pitter actuating means only inoperative for said movement thereof upon said blade meeting with a predetermined resistance in a peach half to said movement, and means for automatically rendering said pitter actuating means operative for said movement for automatically pitting subsequent peach halves presented to said pitter, said means for rendering said blade inoperative including a clutch releasably connecting said pitter actuating means with said power means, and said means for rendering said pitter actuating means operative for said movement including said power means.

8. In combination, a whole peach positioning means adapted to support a whole peach thereon in a predetermined position, a splitter for splitting whole peaches including the pits, a pitter for removing the pit halves from the halves of peaches split by the splitter, a transfer device between said positioning means and said splitter for transferring a whole peach on said positioning means to said splitter, a transfer mechanism between said splitter and said pitter for transferring the peach halves from said splitter to said pitter, said pitter including a blade supported for movement around each of said pit halves and pitter actuating means for so moving said blade, a source of power and power transmission means cooperatively connecting said transfer device, splitter transfer mechanism and pitter actuating means for automatically splitting and pitting peaches and for transferring such peaches between said positioning means and splitter and between said splitter and pitter for peaches being successively positioned on said peach positioning means, means for rendering said pitter actuating means only inoperative for said movement thereof upon said blade meeting with a predetermined resistance in a peach half to said movement, and means for automatically rendering said pitter actuating means operative for said movement for automatically pitting subsequent peach halves presented to said pitter, said transfer means, splitter and transfer mechanism being operatively connected with said power means for continued actuation thereof during the period when said pitter actuating means is rendered inoperative whereby no delay will occur in the successive feeding of peach halves to said pitter, said peach halves at said pitter being released therefrom after each pitting operation.

THEODORE M. HARRER.

(References on following page)

REFERENCES CITED

The following references are of record in the file of this patent:

UNITED STATES PATENTS

| Number | Name | Date |
|---|---|---|
| 117,365 | Baker | July 25, 1871 |
| 496,842 | Arnett | May 9, 1893 |
| 1,537,628 | Street | May 12, 1925 |
| 1,921,276 | Wilcox | Aug. 8, 1933 |
| 1,949,641 | Awa et al. | Mar. 6, 1934 |
| 2,108,535 | Jepson | Feb. 15, 1938 |
| 2,158,545 | Kieweg | May 16, 1939 |
| 2,164,870 | Salardi | July 4, 1939 |
| 2,226,664 | Jepson | Dec. 31, 1940 |
| 2,272,415 | McLauchlan | Feb. 10, 1942 |
| 2,301,979 | Smilie | Nov. 17, 1942 |
| 2,336,123 | Perrelli et al. | Dec. 7, 1943 |
| 2,376,526 | Thompson | May 22, 1945 |
| 2,388,682 | Ewald et al. | Nov. 13, 1945 |
| 2,531,927 | Waters | Nov. 28, 1950 |